US010332242B2

(12) United States Patent
Shen et al.

(10) Patent No.: US 10,332,242 B2
(45) Date of Patent: Jun. 25, 2019

(54) METHOD AND SYSTEM FOR RECONSTRUCTING 360-DEGREE VIDEO

(71) Applicant: OrbViu Inc., San Mateo, CA (US)

(72) Inventors: Jiandong Shen, Cupertino, CA (US); Crusoe Xiaodong Mao, Hillsborough, CA (US); Brian Michael Christopher Watson, Groveland, CA (US); Frederick William Umminger, III, Oakland, CA (US)

(73) Assignee: OrbViu Inc., San Mateo, CA (US)

( * ) Notice: Subject to any disclaimer, the term of this patent is extended or adjusted under 35 U.S.C. 154(b) by 0 days.

(21) Appl. No.: 15/873,906

(22) Filed: Jan. 18, 2018

(65) Prior Publication Data

US 2018/0218484 A1    Aug. 2, 2018

Related U.S. Application Data

(60) Provisional application No. 62/453,518, filed on Feb. 2, 2017.

(51) Int. Cl.
*G06T 5/50* (2006.01)
*H04N 7/01* (2006.01)
*G06T 3/40* (2006.01)

(52) U.S. Cl.
CPC ............. *G06T 5/50* (2013.01); *G06T 3/4007* (2013.01); *H04N 7/014* (2013.01); *G06T 2207/10016* (2013.01); *G06T 2207/20021* (2013.01); *G06T 2207/20221* (2013.01)

(58) Field of Classification Search
CPC ............ G06T 5/50; G06T 3/4007; G06T 2207/20221; G06T 2207/10016; G06T 2207/20021; H04N 7/014
See application file for complete search history.

(56) References Cited

U.S. PATENT DOCUMENTS

| | | |
|---|---|---|
| 8,548,269 B2 | 10/2013 | Zargarpour et al. |
| 9,811,946 B1 | 11/2017 | Hung et al. |
| 2016/0088285 A1 | 3/2016 | Sadi et al. |
| 2017/0230668 A1 | 8/2017 | Lin et al. |
| 2017/0264942 A1 | 9/2017 | Li et al. |
| 2017/0345136 A1 | 11/2017 | Van Der et al. |
| 2018/0063440 A1* | 3/2018 | Kopf ................. H04N 5/23267 |
| 2018/0091768 A1* | 3/2018 | Adsumilli ............ H04N 7/0137 |
| 2018/0295400 A1* | 10/2018 | Thomas ........... H04N 21/85406 |

* cited by examiner

*Primary Examiner* — Phuoc Tran
(74) *Attorney, Agent, or Firm* — Kanika Radhakrishnan; Evergreen Valley Law Group

(57) ABSTRACT

Methods and system for reconstructing 360-degree video is disclosed. A video sequence V1 including a plurality of frames associated with spherical content at a first frame rate and a video sequence V2 including a plurality of frames associated with a predefined viewport at a second frame rate is received by a processor. The first frame rate is lower than the second frame rate. An interpolated video sequence V1' of the video sequence V1 is generated by creating a plurality of intermediate frames between a set of consecutive frames of the plurality of frames of the sequence V1 corresponding to the second frame rate of the video sequence V2. A pixel based blending of each intermediate frame of the plurality of the intermediate frames of sequence V1' with a corresponding frame of the plurality of frames the sequence V2 is performed to generate a fused video sequence Vm for displaying.

20 Claims, 13 Drawing Sheets

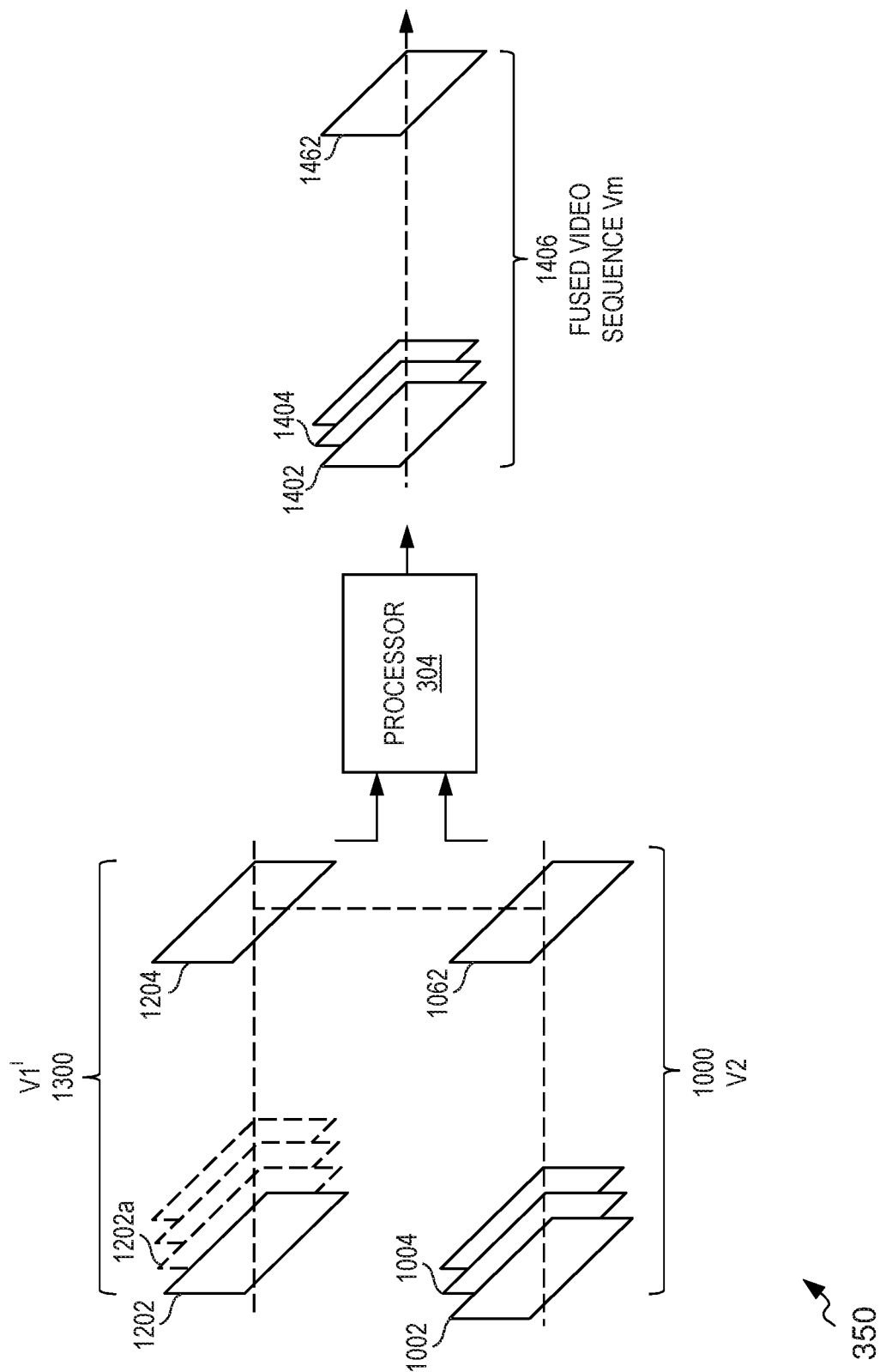

METHOD AND SYSTEM FOR RECONSTRUCTING 360-DEGREE VIDEO

TECHNICAL FIELD

The present invention generally relates to video processing and, more specifically, to a method and system for reconstructing 360-degree video for a virtual reality display device.

BACKGROUND

Virtual Reality (VR) has been an effective means of sharing experiences and providing an immersive environment by streaming a 360-degree video to a VR display device for viewing by a user. The 360-degree videos usually have large file sizes thereby making it an impediment to deliver without compromising on quality to the VR display device. In order to reduce high bandwidth required in delivering 360-degree video to the VR display devices, compression techniques for 360-degree video encoding and network transmission have to be deployed.

An effective technique for 360-degree video compression involves view-dependent streaming where a fraction of the 360-degree video frame (hereinafter referred to a 'viewport') that corresponds to the part of 360-degree video, the user can currently see, i.e., the field of view (FOV) of the user, is streamed to the VR display device with high quality. For the part of 360-degree video that is outside of the user's field of view, it is to be streamed to the VR display with lower quality. This technique is commonly known as view optimization.

A state of art view optimization technique involves applying 3D pyramid mapping to each frame of the 360-degree video. In this technique, each frame of the 360-degree video is converted into a smaller pyramid shaped video frame to create a viewport. The front view of each of such view ports has full resolution and full frame rate video data while side views and rear views involve gradually increased spatial compression. Aforesaid technique results in a reduction in file size of the 360-degree video and provides a high video quality of the front view. However, when the user turns to a side or to back the heavy spatial compression provides a low quality video experience. To overcome low quality of the side views, the user may be provided with another viewport with the view orientation aligned to that of the user, instead of viewing the side view of the previous viewport. However, the switching from one viewport to another viewport often involves delay due to network latency and video decoding process. Therefore, the low quality video can still be seen depending on the user head movement which causes unpleasant viewing experience.

Accordingly, there is a need for a solution that can help improve the video quality of the 360-degree video irrespective of amount of motion in the video content. Further, there is a need to improve the video quality without involving major increases in total network bandwidth.

SUMMARY

Various embodiments of the present disclosure provide system and methods for reconstructing a 360-degree video.

In an embodiment, a method for reconstructing a 360-degree video is disclosed. The method includes receiving, by a processor, a video sequence V1 and a video sequence V2. The video sequence V1 includes a plurality of frames associated with spherical content at a first frame rate and the video sequence V2 includes a plurality of frames associated with a predefined viewport at a second frame rate. The first frame rate is lower than the second frame rate. The method further includes generating, by the processor, an interpolated video sequence V1' of the video sequence V1. Generating the interpolated video sequence V1' includes creating a plurality of intermediate frames between a set of consecutive frames of the plurality of frames of the video sequence V1 corresponding to the second frame rate of the video sequence V2. Furthermore, the method includes performing, by the processor, a pixel based blending of each intermediate frame of the plurality of the intermediate frames of the interpolated video sequence V1' with a corresponding frame of the plurality of frames the video sequence V2 to generate a fused video sequence Vm for displaying.

In another embodiment, a system for reconstructing a 360-degree video is disclosed. The system includes a communication interface, a frame interpolator, a memory and a processor communicably coupled to the communication interface, the frame interpolator and the memory. The communication interface is configured to receive a video sequence V1 and a video sequence V2. The video sequence V1 includes a plurality of frames associated with spherical content at a first frame rate and the video sequence V2 includes a plurality of frames associated with a predefined viewport at a second frame rate. The first frame rate is lower than the second frame rate. The frame interpolator is configured to generate an interpolated video sequence V1' of the video sequence V1. Generating the interpolated video sequence V1' includes creating a plurality of intermediate frames between a set of consecutive frames of the plurality of frames of the video sequence V1 corresponding to the second frame rate of the video sequence V2. The memory includes executable instructions. The processor is configured to execute the instructions to cause to the system to perform a pixel based blending of each intermediate frame of the plurality of the intermediate frames of sequence V1' with a corresponding frame of the plurality of frames the video sequence V2 to generate a fused video sequence Vm for displaying.

In another embodiment, a method for reconstructing a 360-degree video is disclosed. The method includes receiving, by a processor, a video sequence V1 and a video sequence V2. The video sequence V1 includes a plurality of frames associated with spherical content at a first frame rate and the video sequence V2 includes a plurality of frames associated with a predefined viewport at a second frame rate. The first frame rate is lower than the second frame rate. The method includes performing, by the processor, a sphere rotation of the sequence V1 to achieve a default view orientation. The method further includes generating, by the processor, an interpolated video sequence V1' of the sequence V1 by creating a plurality of intermediate frames. Creating the plurality of intermediate frames includes performing one of: selecting a set of consecutive frames of the plurality of frames of the sequence V1 corresponding to the second frame rate of sequence V2 for performing a temporal fusion, and selecting a set of frames in the sequence V2 based on matching temporal location from a corresponding set of consecutive frames of the sequence V1 to perform a motion estimation and a motion compensation between the set of selected frames in the sequence V2. Furthermore, the method includes performing, by the processor, a pixel based blending of an intermediate frame of the plurality of the intermediate frames of sequence V1' with a corresponding frame of the plurality of frames the sequence V2 to generate a fused video sequence Vm for displaying.

BRIEF DESCRIPTION OF THE FIGURES

For a more complete understanding of example embodiments of the present technology, reference is now made to the following descriptions taken in connection with the accompanying drawings in which:

FIG. 3B illustrates an example representation of reconstruction of a fused video sequence, in accordance with an example embodiment of the disclosure;

The drawings referred to in this description are not to be understood as being drawn to scale except if specifically noted, and such drawings are only exemplary in nature.

DETAILED DESCRIPTION

Figure 1A:
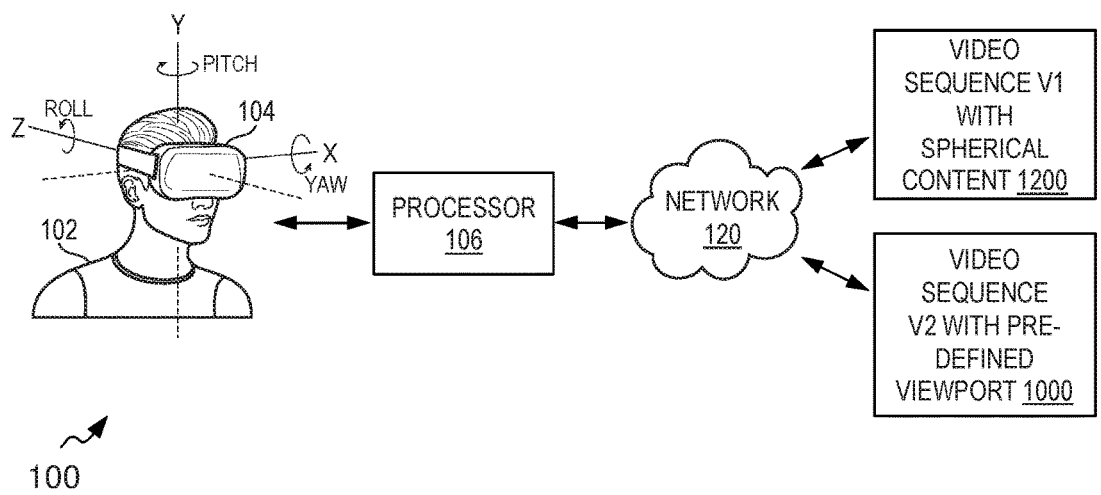
FIG. 1A illustrates an example representation of an environment, in which at least some example embodiments of the present disclosure can be implemented.
Figure 1B:
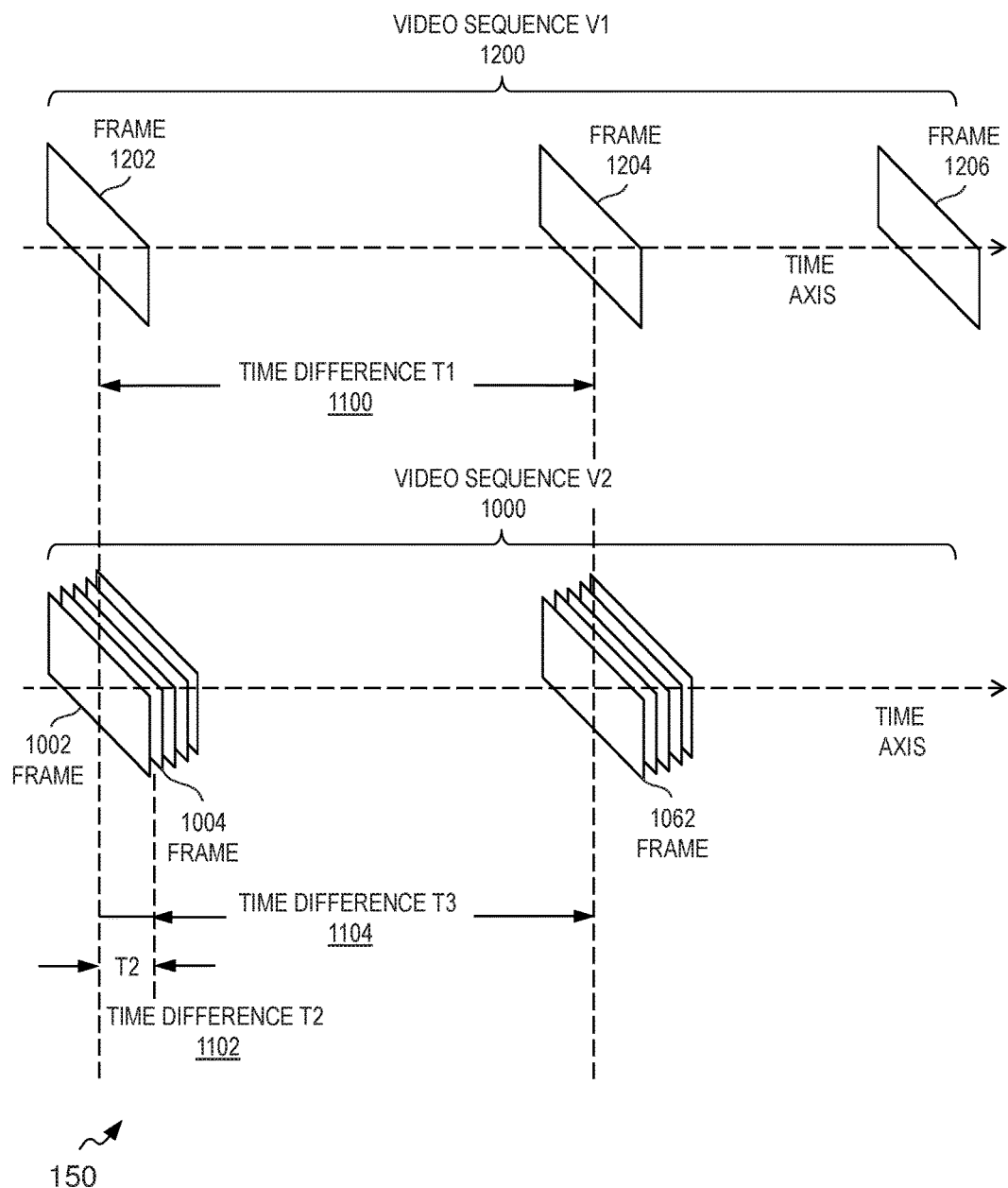
FIG. 1B illustrates an example representation of a plurality of input video sequences for reconstruction of a 360-degree video, in accordance with an example embodiment of the disclosure.
Figure 8:
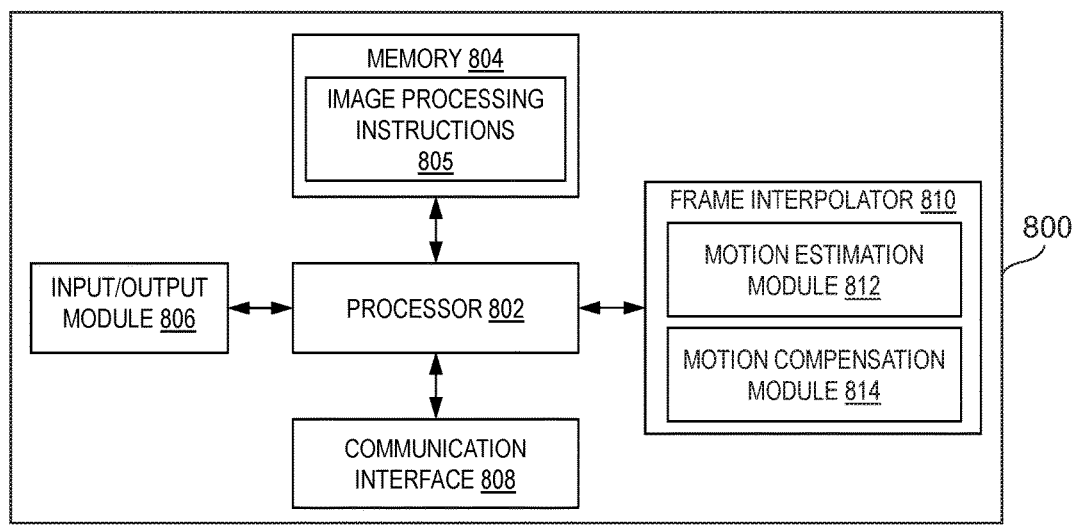
FIG. 8 illustrates a simplified block diagram of a system configured to reconstruct a 360-degree video, in accordance with an example embodiment of the disclosure.

The best and other modes for carrying out the present invention are presented in terms of the embodiments, herein depicted in FIGS. 1A-1B to 8. The embodiments are described herein for illustrative purposes and are subject to many variations. It is understood that various omissions and substitutions of equivalents are contemplated as circumstances may suggest or render expedient, but are intended to cover the application or implementation without departing from the spirit or the scope of the present invention. Further, it is to be understood that the phraseology and terminology employed herein are for the purpose of the description and should not be regarded as limiting. Any heading utilized within this description is for convenience only and has no legal or limiting effect. The terms "a" and "a" herein do not denote a limitation of quantity, but rather denote the presence of at least one of the referenced item.

Various embodiments of the present technology provide methods and system for reconstructing 360-degree video. In the disclosed embodiments, a side/supplementary information in form of a video sequence V1 with high resolution spherical content at a first frame rate (e.g., 1 frame per second (fps)) is provided along with a video sequence V2 with a variable resolution of a predefined (i.e., conventional) viewport at a second frame rate (e.g., 30 frames per second (fps)) to a system/a video player device such as the VR display device. At the video player device, the side information may be combined with the conventional viewport to recover lost sharpness while reconstructing a fused 360-degree video sequence Vm. The system may be configured to perform one or more of a temporal fusion, a spatial fusion, a motion estimation, a motion compensation between a plurality of frames of the input video sequences V1 and V2 to generate a plurality of intermediate frames of an interpolated video sequence V1'. Further, the system may be configured to perform a pixel based/macroblock based blending between the frames of the sequences V1' and V2 to generate the sequence Vm with a plurality of fused video frames. Such processing may help to maintain sharpness of the stationary background as well as motion of the fast moving background. Various embodiments of the present disclosure reduce a processing and storage requirement at the system. Further, disclosed embodiments reduce file size of the 360-degree video for transmission while maintaining a high quality 360-degree video. Various embodiments of the present disclosure for reconstructing 360-degree video are explained hereinafter with reference to FIGS. 1A-1B to 8.

FIG. 1A illustrates an example representation of an environment 100, in which at least some example embodiments of the present disclosure can be implemented. As such, it should be noted that at least some of the components described below in connection with the environment 100 may be optional and thus in some example embodiments may include more, less or different components than those described in connection with the example embodiment of FIG. 1A or with subsequent figures.

The environment 100 may represent a virtual reality (VR) immersive environment where video signals may be captured from camera devices or decoded from video streams obtained from a remote server (not shown) over a network 120 and displayed to a user 102 via a head mounted display device/a Virtual Reality display device 104 (hereinafter referred to as VR device 104). When watching a 360-degree video, at any given time, the user 102 may face a certain direction. Thus, the VR device 104 needs to render and display only the content in that particular viewing direction, which is typically a fraction (e.g., 20%) of the whole sphere content. The VR device 104 is configured to extract a viewport (i.e., only a fraction of an omnidirectional view of the scene) in real-time according to the head movements of the user 102 using one or more in-built sensors such as an accelerometer, a gyroscope, a magnetometer and the like. Head movements modify the viewport center, requiring a new viewport to be displayed. However, as the remaining content is streamed with a heavy compression to reduce the file size of the 360-degree video, it results in a blurred view when the user 102 moves his head in any direction. The user's head motion may be determined based on three rotational orientations such as pitch, yaw, and roll, as shown with respective x-axis, y-axis and z-axis in FIG. 1A. For example, yaw is the side to side movement—looking left and right. Pitch is the motion when the user 102 looks up or down and roll is tilting the head side to side. Moreover, while watching a video with faster motion content, the heavy compression of the remaining content results in loss of optimum motion sharpness.

Various embodiments of the present disclosure provide techniques for achieving a high quality of the 360-degree video irrespective of the amount of motion in the video content and without involving major increases in total network bandwidth. In various embodiments, the VR device 104 is configured to receive a supplementary video sequence that can be fused with a current/predefined/conventional viewport of the video sequence being watched by the user 102 to generate a fused video sequence that significantly recovers the lost sharpness occurred due to user movements and/or fast motion content of the current viewport.

As shown in FIG. 1A, the VR device 104 receives a set of input video sequences such as a video sequence V1 1200 (hereinafter alternatively referred to as sequence V1 1200) with high resolution spherical content and a video sequence V2 1000 (hereinafter alternatively referred to as sequence V2 1000) with a variable resolution of predefined (e.g., current/conventional) viewport over a network 120. The set of input video sequences V1 and V2 may relate to the video signals of a scene captured from a plurality of perspectives depending on movement of the user and/or movement of the scene. The set of input video sequences V1 and V2 may be captured from camera devices or decoded from video streams obtained from the network 120.

The network 120 may be a centralized network or may include a plurality of sub-networks that may offer a direct or indirect communication between the entities. For example, the network 120 may include wired networks, wireless networks and combinations thereof. Some non-limiting examples of the wired networks may include Ethernet, local area networks (LANs), fiber-optic networks, and the like. Some non-limiting examples of the wireless networks may include cellular networks like GSM/3G/4G/5G/LTE/CDMA networks, wireless LANs, Bluetooth, Wi-Fi or ZigBee networks, and the like. An example of the combination of wired and wireless networks may include the Internet.

The VR device 104 may be an example of a system that may include a video processor such as the processor 106 and a VR display device. The system may be a distributed system where the processor 106 may be hosted on an electronic device such as a computer, a laptop, a desktop, a server and the like, and the VR device 104 may be a display of a mobile handset which is communicatively coupled to the processor 106. In at least one embodiment, the system may be a VR equipment such as the VR device 104. In an example embodiment, the processor 106 may be incorporated within the VR device 104 and may further include additional components and/or modules such as a frame interpolator, a motion estimation module, a motion compensation module, a temporal fusion module, a spatial fusion module etc. to perform various features of the present technology. For example, in an at least one embodiment, the VR device 104 and/or the processor 106 is configured to process the set of input video sequences (i.e., V1 1200 and V2 1000) to reconstruct 360-degree video with high quality and full spatial and temporal resolution.

FIG. 1B illustrates an example representation 150 of a plurality of input video sequences (i.e., sequences V1 1200 and V2 1000) for reconstruction of a 360-degree video, in accordance with an example embodiment of the disclosure.

In the illustrated example representation 150, the sequence V1 1200 is a side information in form of a high resolution full spherical video sequence at a low frame rate, for example, 1 frame per second (fps) and the sequence V2 1000 is the conventional viewport with variable resolution at a normal frame rate such as 30 frames per second (fps).

As shown, the sequence V1 1200 includes a plurality of frames such as a frame 1202, a frame 1204, a frame 1206 and the like. A time difference T1 1100 between two consecutive frames such as the frame 1202 and the frame 1204 is 1 second for a frame rate of 1 fps. Similarly, the sequence V2 1000 includes a plurality of frames such as a frame 1002, a frame 1004 . . . a frame 1062 and the like. A time difference T2 1102 between two consecutive frames such as the frame 1002 and the frame 1004 is ⅟30 second for a frame rate of 30 fps. It is further apparent from the FIG. 1B that for the consecutive frames 1202 and 1204 of the sequence V1 1200 having the time difference T1 1100 of 1 second, corresponding temporally co-located frames in the sequence V2 1000 may be determined to be frames 1002 and 1062 respectively, as the frames 1002 and 1062 have similar time difference T3 1104 of 1 second, and occur at the same time intervals.

The sequence V1 1200 may usually be streamed as supplementary information along with the sequence V2 1000 to the VR device 104 to enable high quality reconstruction of the 360-degree video sequence Vm (not shown in FIG. 1B) for display on the VR device 104. The 360-degree video sequence Vm may include a full spherical content with high resolution and normal frame rate for example, 30 fps. In an embodiment, the 360-degree video sequence Vm is reconstructed by the VR device 104 by performing various techniques such as a temporal fusion, a spatial fusion, a motion estimation, a motion compensation, a pixel based blending and the like between the plurality of frames of the sequences V1 1200 and V2 1000 to generate the sequence Vm with a plurality of fused video frames. These techniques are explained hereinafter with reference to FIGS. 2 to 8.

Figure 2:
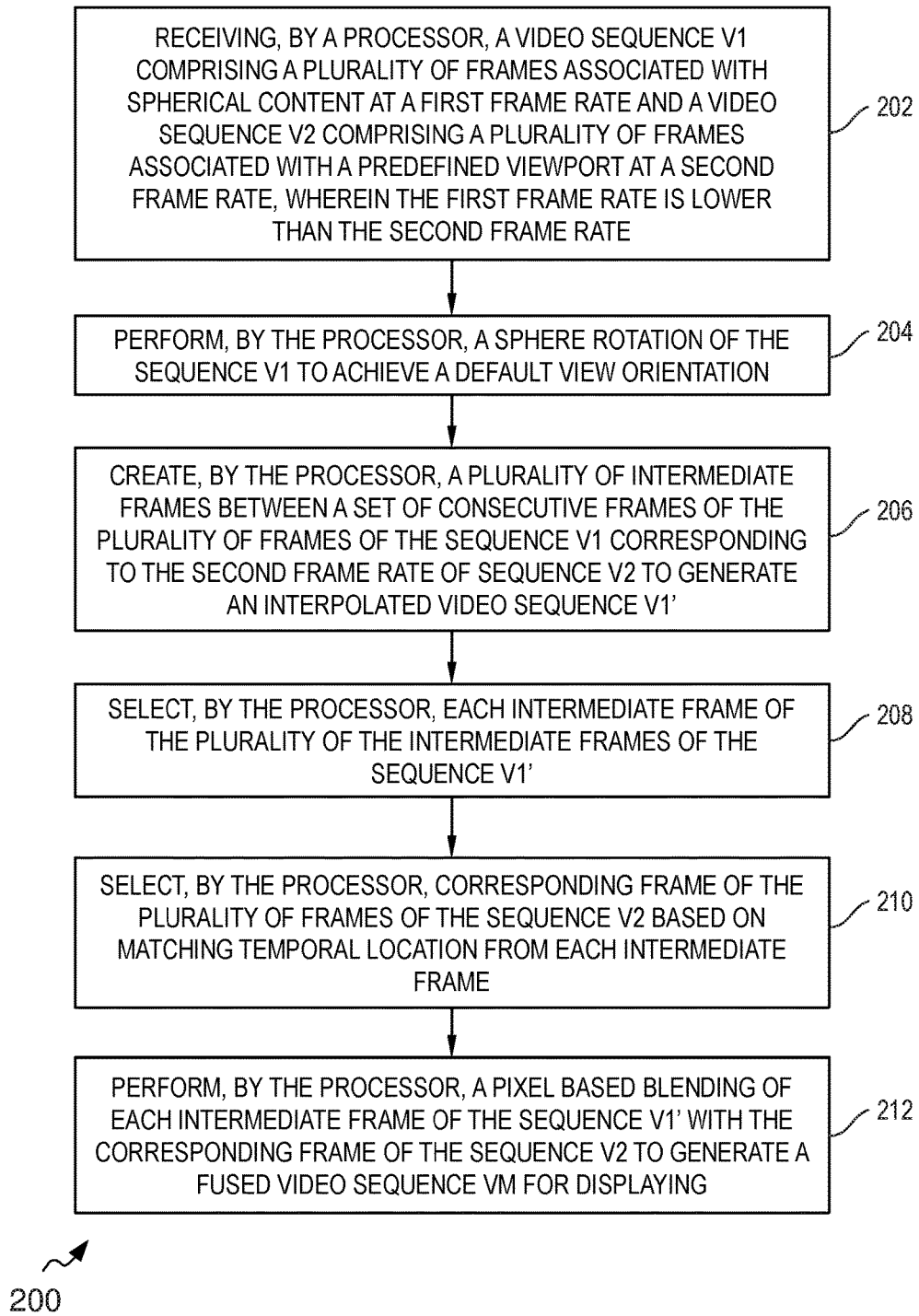
FIG. 2 shows a flowchart illustrating a method for reconstructing a 360-degree video, in accordance with an example embodiment of the disclosure.

FIG. 2 shows a flowchart illustrating a method 200 for reconstructing a 360-degree video, in accordance with an example embodiment of the disclosure. The various steps and/or operations of the flow diagram, and combinations of steps/operations in the flow diagram, may be implemented by, for example, hardware, firmware, a processor, circuitry and/or by a system or the VR device 104 of FIG. 1A and/or by a different electronic device associated with the execution of software that includes one or more computer program instructions.

At 202, a video sequence V1 (e.g., sequence V1 1200) including a plurality of frames associated with spherical content at a first frame rate and a video sequence V2 (e.g., sequence V2 1000) including a plurality of frames associated with a predefined viewport at a second frame rate is received by a processor. The first frame rate (1 fps) is lower than the second frame rate (30 fps). In an embodiment, the processor may be a component of a VR device such as the VR device 104 or a system and may be configured to include image processing instructions to reconstruct a 360-degree fused video sequence Vm.

At 204, a sphere rotation of the sequence V1 is performed to achieve a default view orientation. As explained with reference to FIG. 1A, if the view orientation of the user 102 is not at a default zero angle yaw (y-axis) and a default zero angle pitch (x-axis), a sphere rotation of the sequence V1 1200 may be required. As a result, a new sphere rotated sequence V1 1200 is formed with a new view center that matches the view orientation of the user 102.

At 206, a plurality of intermediate frames are created by the processor between a set of consecutive frames of the plurality of frames of the sequence V1 corresponding to the second frame rate of sequence V2 to generate an interpolated video sequence V1' (hereinafter alternative referred to as sequence V1'). A frame rate interpolation is performed between two consecutive frames of the sequence V1 1200 to create an interpolated video sequence V1'. In an embodiment, the VR device 104 may include a frame interpolator configured to perform frame interpolation between the frames. This is explained later with reference to FIG. 3A.

At 208, each intermediate frame of the plurality of the intermediate frames of the sequence V1' is selected by the processor.

At 210, corresponding frame of the plurality of frames of the sequence V2 based on matching temporal location from each intermediate frame is selected by the processor. This is explained later with reference to FIG. 3B.

At 212, a pixel based blending of each intermediate frame of the sequence V1' with the corresponding frame of the sequence V2 is performed by the processor to generate a fused video sequence Vm (hereinafter alternatively referred to as sequence Vm) for displaying. This is explained later with reference to FIG. 3C. The method 200 ends at 212.

Figure 3A:
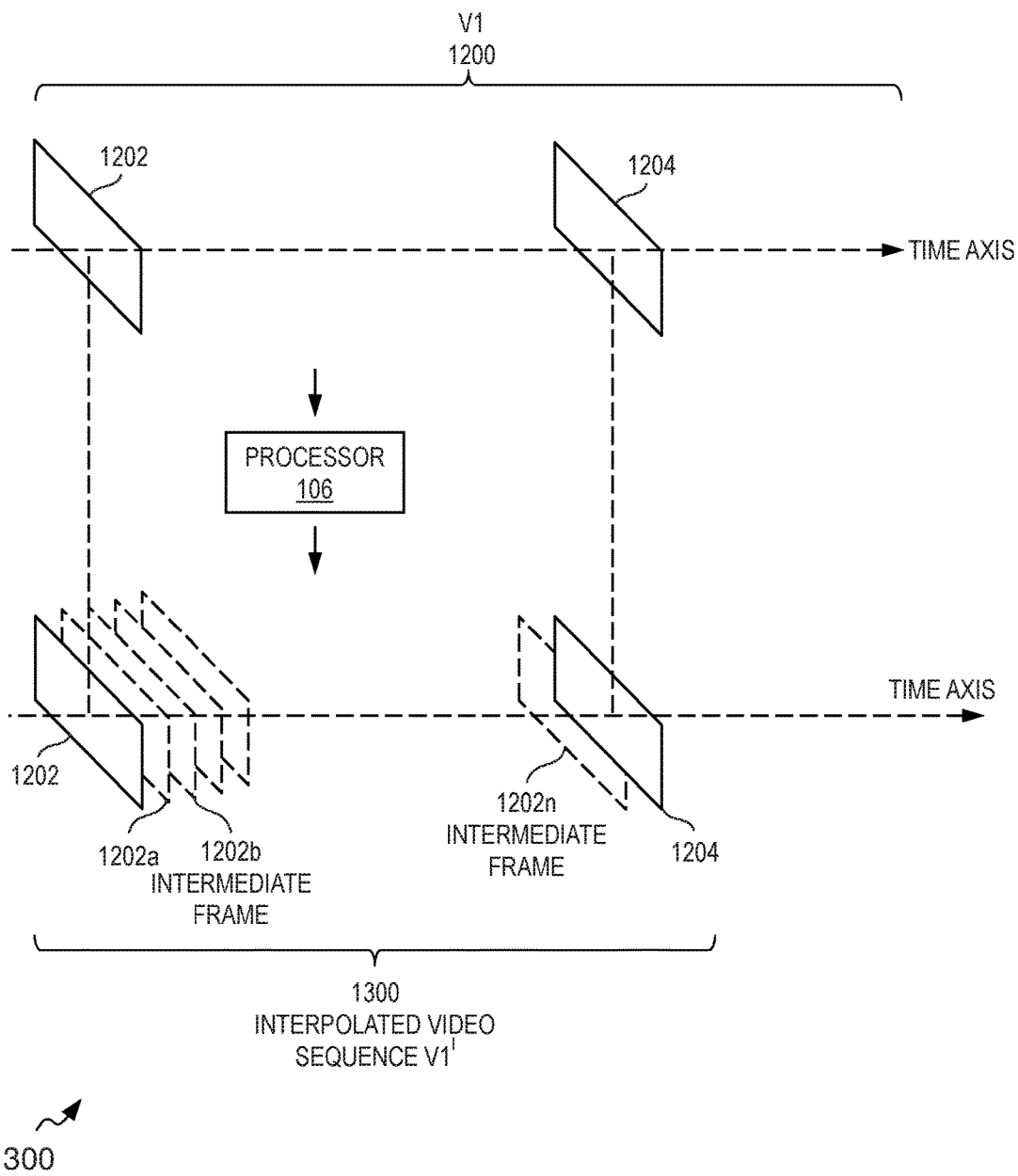
FIG. 3A illustrates an example representation of frame interpolation of an input video sequence of FIG. 1B, in accordance with an example embodiment of the disclosure.

FIG. 3A illustrates an example representation 300 of frame interpolation of an input video sequence V1 1200 of FIG. 1B, in accordance with an example embodiment of the disclosure. More specifically, FIG. 3A illustrates the frame interpolation of the supplementary video sequence V1 1200 to create an interpolated video sequence V1' 1300 according to operation 204 of the method 200. In an embodiment, the sequence V1' 1300 is an up-converted high frame rate video sequence. In at least one embodiment, a temporal fusion based frame interpolation and/or motion-compensated frame interpolation are performed by the processor 106 to generate intermediate animation frames between existing ones by means of interpolation to make animation more fluid and to compensate for display motion blur.

In one embodiment, the sequence V1 1200 may be provided as an input to the processor 106 of FIG. 1A to create the sequence V1' 1300. In an embodiment, the processor 106 may include a frame interpolator to apply a pixel based alpha blending to a set of consecutive frames such as the frame 1202 and the frame 1204 of the V1 sequence 1200 to obtain a plurality of intermediate frames 1202a, 1202b, . . . 1202n between the frame 1202 and the frame 1204. For generating an intermediate frame of the plurality of intermediate frames 1202a-n between the set of consecutive frames such as the frame 1202 (being frame R1) and the frame 1204 (being frame R2) of the sequence V1 1200, a pixel based alpha blending may be performed by the processor 106 based on the following equation (1):

$$r'(i,x,y)=\text{alpha}(i)*R1(x,y)+(1-\text{alpha}(i))*R2(x,y)) \qquad (1)$$

where, (x, y) is a pixel location.

R1(x, y) is a pixel at the pixel location (x, y) of the frame 1202 of the sequence V1 1200.

R2(x, y) is a pixel at the pixel location (x, y) of the consecutive frame 1204 of the sequence V1 1200.

i is an index of the intermediate frame between the frames R1 and R2.

alpha(i) is a blending factor based on a value of i.

r'(i, x, y) is a pixel at a location (x, y) of the intermediate frame between the frames R1 and R2 with the index i.

The aforesaid equation (1) may be performed for each frame of the sequence V1 1200 to create the sequence V1' 1300. As explained with reference to operation 208 of FIG. 2, an intermediate frame of the plurality of the intermediate frames 1202a-n of sequence V1' 1300 may be selected. A corresponding frame of the plurality of frames the sequence V2 1000 based on matching temporal location from the intermediate frame may also be selected (operation 210). A fussed video sequence Vm may be generated by fusing sequence V1' 1300 with the sequence V2 1000. This is explained hereinafter with reference to FIG. 3B.

Figure 3C:
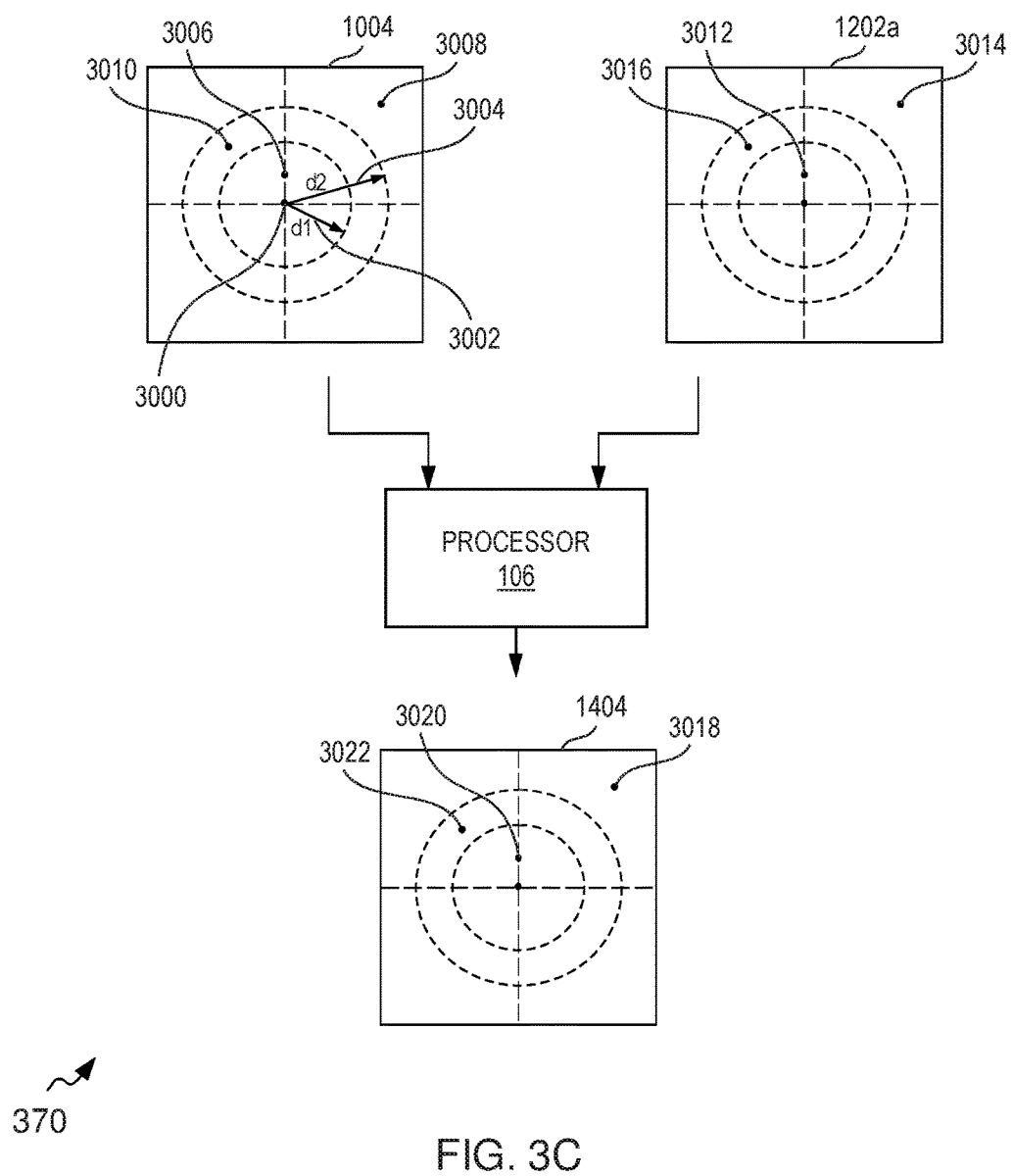
FIG. 3C illustrates an example representation of reconstruction of a frame of the fused video sequence of FIG. 3B using pixel based blending, in accordance with an example embodiment of the disclosure.

FIG. 3B illustrates an example representation 350 of reconstruction of a fused video sequence, in accordance with an example embodiment of the disclosure. The up-converted sequence V1' 1300 and the sequence V2 1000 are provided to the processor 106 (see, FIG. 1A). The processor 106 may further be configured to perform spatial fusion between temporally co-located frames of the sequence V1' 1300 and the sequence V2 1000 to create a fused video sequence Vm 1400 (hereinafter alternatively referred to as sequence Vm 1400). As shown, the sequence Vm 1400 includes a plurality of fused video frames such as a frame 1402, a frame 1404 . . . a frame 1462 and the like. In an example embodiment, a pixel based alpha blending may be performed as part of the spatial fusion between temporally co-located frames to reconstruct a frame of the sequence Vm 1400. For example, the intermediate frame 1202a of the sequence V1' 1300 is shown to be temporally co-located with the frame 1004 of the sequence V2 1000, as both occur at a similar time interval. In one embodiment, a pixel based alpha blending can be accomplished by blending each pixel from the frame 1202a with a corresponding pixel from the frame 1004 to generate each pixel of the fused video frame 1404. Alpha is a blending factor or the percentage of the color from the frame 1202a used in the blended frame 1404. The pixel based alpha blending between the temporally co-located frames to reconstruct the frame 1404 of the fused video sequence Vm 1400 is explained hereinafter with reference to FIG. 3C FIG. 3C illustrates an example representation 370 of reconstruction of a frame 1404 of the fused video sequence Vm 1400 of FIG. 3B using pixel based blending, in accordance with an example embodiment of the disclosure. For the frame 1404 (being frame F) of the sequence Vm 1400, the processor 106 is configured to perform the pixel based alpha blending between the intermediate frame 1202a (being frame R') of the sequence V1' 1300 and the corresponding frame 1004 (being frame P) of the sequence V2 100 based on the following equation (2):

$$F(x,y)=\text{alpha}(x,y)*P(x,y)+(1-\text{alpha}(x,y))*R'(x,y)) \qquad (2)$$

where, (x, y) is a pixel location.

F(x, y) is a value of a pixel at the pixel location (x, y) of the fused video frame 1404 of the sequence Vm 1400.

alpha(x, y) is a blending factor at the pixel location (x, y).

P(x, y) is a value of a pixel at the pixel location (x, y) of the frame 1004 of the sequence V2 1000.

R'(x, y) is a value of a pixel at the pixel location (x, y) of the temporally co-located frame 1202a of the sequence V1' 1300.

The aforesaid equation (2) may be performed for each frame of the sequence V1' 1300 and the sequence V2 1000 to create the sequence Vm 1400.

The value of the blending factor alpha(x, y) is determined based on a normalized distance of a location of the pixel (x, y) to be reconstructed from the center of a video frame i.e., a view center (x0, y0) 3000. The closer the location of the pixel (x, y) is to the view center (x0, y0) 3000, the closer is the value of the blending factor alpha(x, y) to 1.0. The farther the location of the pixel(x, y) from the view center (x0, y0) 3000, the closer is the value of the blending factor alpha(x, y) to a value 0.0.

In an example embodiment, a value of alpha(x, y) may be set to 1.0 for a location of the pixel (x, y) lying within a predetermined distance of a pixel at a location (|x|<⅛, |y|<⅛) from the view center (x0, y0) 3000. This is exemplarily represented as a radial distance d1 3002 from the view center (x0, y0) 3000. As a result, for pixels lying within the radial distance d1 3002, the corresponding pixel P(x, y) of the frame 1004 of the sequence V2 1000 (i.e., the conventional viewport) may completely be used for reconstructing the pixel F(x, y) of the fused frame 1404 of the fused video sequence Vm 1400. In such a case, front view of the fused frame 1404 is reconstructed completely from the frame 1004 of the sequence V2 1000, and it may have high quality resolution and a high frame rate. For example, while reconstructing a pixel F1(x, y) 3020 of the fused frame 1404 using a pixel P1(x, y) 3006 of the frame 1004 and a pixel R'1(x, y) 3012 of the frame 1202a, the value of the alpha(x, y) blending factor may be equal to 1.0. As a result, the pixel F1(x, y) 3020 may completely include the pixel P1(x, y) 3006 of the frame 1004.

Further, a value of alpha(x, y) may be set to 0.0 for a location of the pixel (x, y) lying outside a predetermined distance of a pixel at a location (|x|<⅜, |y|<⅜) from the view center (x0, y0) 3000. This is exemplarily represented as a radial distance d2 3004 from the view center (x0, y0) 3000. As a result, for pixels lying outside the radial distance d2 3004, the corresponding pixel R'(x, y) of the intermediate frame 1202a of sequence V1' 1300 (i.e., the interpolated video sequence) may completely be used for reconstructing the pixel F(x, y) of the fused frame 1404 as the value of the alpha(x, y) is set to 0.0. In other words, a rear view of the fused frame 1404 is reconstructed from the intermediate frame 1202a of the sequence V1' 1300. For example, while reconstructing a pixel F2(x, y) 3018 of the fused frame 1404, from a pixel P2(x, y) 3008 of the frame 1004, and a pixel R'2(x, y) 3014 of the intermediate frame 1202a, the value of alpha(x, y) may be set to 0.0, due to which the pixel F2(x, y) 3018 may completely include the pixel R'2(x, y) 3014 of the frame 1202a. A high quality and high resolution video in the rear view of the fused frame 1400 can be achieved if the video content in the rear view includes slow motion. If the content has fast motion, the rear view may contain motion blurry artifact despite having high resolution.

Further, the value of alpha(x, y) may be set between 1.0 to 0.0 for a location of the pixel (x, y) lying within a predetermined distance of a pixel at a location (⅜>|x|>⅛, ⅜>|y|>⅛) from the view center (x0, y0). As a result, for pixels lying between the radial distance d1 3002 and the radial distance d2 3004, the pixel R'(x, y) of the frame 1202a of the sequence V1' 1300 and the pixel P(x, y) of the frame 1004 of the conventional viewport sequence V2 1000 may be used partially for reconstructing the pixel F(x, y) of the frame 1404 as the value of alpha(x, y) may be set to be linearly changed between 1.0 to 0.0. For example, while reconstructing a pixel F3(x, y) 3022, which lies between the radial distance d1 3002 and the radial distance d2 3004 of the frame 1404, a pixel P3(x, y) 3010 of the frame 1004 and a pixel R'3(x, y) 3016 of the frame 1202a may be used partially as the alpha(x, y) may be set to a value between 1.0 to 0.0. Accordingly, a side view of the fused frame 1404 may include a blending of the intermediate frame 1202a and the conventional viewport frame 1004. This may sometimes result in motion related blurredness in the fused video sequence Vm 1400.

As explained hereinabove, a 360-degree fused video (i.e., sequence Vm 1400) generated by the processor 106 using the input sequences V1 and V2 by applying temporal fusion and spatial fusion can provide a sharpest reconstructed video frame when there is less motion in the video content. In at least one example embodiment, the processor 106 is configured to generate a 360-degree fused video using motion estimation and motion compensation fusion techniques that can provide a sharp reconstructed video frame when there is a large amount of motion. In an embodiment, motion-compensated frame interpolation is performed to create intermediate animation frames of a full interpolated video sequence V1' to compensate for the motion blur and to produce a more balanced video quality.

In some scenarios, there may be objects motions between two frames of the video sequence V1 which may be captured in the sequence V2, but not in V1 due to low frame rate. For such scenarios, motion compensation technique is used for obtaining the video sequence V1', before generating a fused video sequence, as described with reference to FIG. 4.

Figure 4:
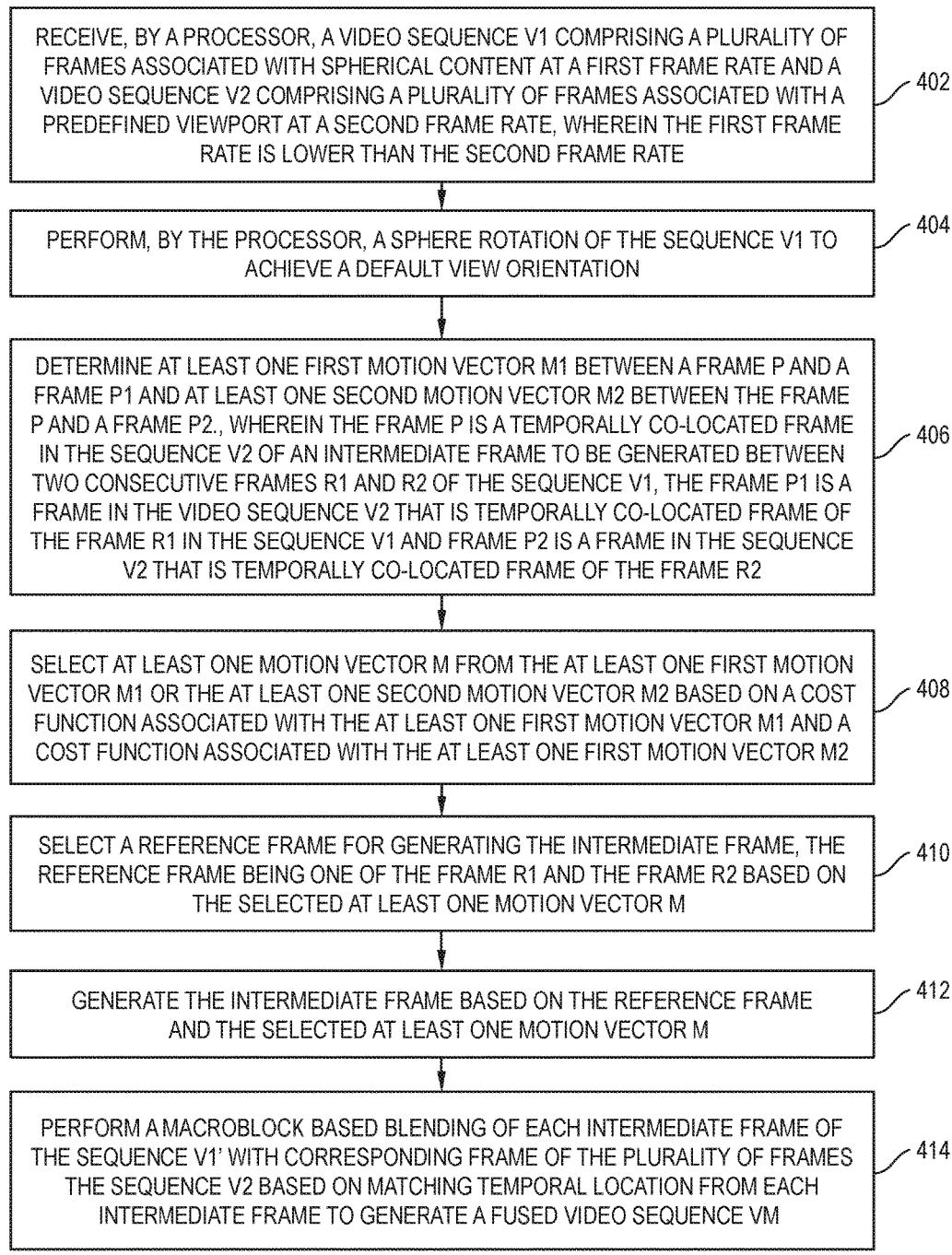
FIG. 4 shows a flowchart illustrating a method for reconstructing a 360-degree video, in accordance with another example embodiment of the disclosure.

FIG. 4 shows a flowchart illustrating a method 400 for reconstructing a 360-degree video, in accordance with another example embodiment of the disclosure. The various steps and/or operations of the flow diagram, and combinations of steps/operations in the flow diagram, may be implemented by, for example, hardware, firmware, a processor (e.g., the processor 106), circuitry and/or by the VR device 104 of FIG. 1A and/or by a different electronic device associated with the execution of software that includes one or more computer program instructions.

At 402, a video sequence V1 including a plurality of frames associated with spherical content at a first frame rate and a video sequence V2 including a plurality of frames associated with a predefined viewport at a second frame rate are received by a processor. The first frame rate (e.g., 1 fps) is lower than the second frame rate (e.g., 30 fps). As explained with reference to FIG. 1B, the sequence V1 1200 includes the frame 1202, the frame 1204, the frame 1206 and the like at a frame rate of 1 fps. Similarly, the sequence V2 1000 includes the frame 1002, the frame 1004 ... the frame 1062 and the like at a frame rate of 30 fps. The processor, such as the processor 106 of the VR device 104 may be configured to receive the input video sequences V1 1200 and V2 1000.

At 404, a sphere rotation of the sequence V1 is performed to achieve a default view orientation. If the view orientation of the user 102 is not at a default zero angle yaw (y-axis) and a default zero angle pitch (x-axis), the sequence V1 may be rotated.

At 406, at least one first motion vector M1 between a frame P and a frame P1 and at least one second motion vector M2 between the frame P and a frame P2 is determined. The frame P is a temporally co-located frame in the sequence V2 of an intermediate frame to be generated between two consecutive frames R1 and R2 of the sequence V1. The frame P1 is a frame in the video sequence V2 is that is temporally co-located frame of the frame R1 in the video sequence V1 and frame P2 is a frame in the video sequence V2 that is temporally co-located frame of the frame R2 in the video sequence V1. As explained with reference to FIG. 1B, the frame 1202 (being the frame R1) and the frame 1204 (being the frame R2) of the sequence V1 1200 are consecutive frames having the time difference T1 1100 of 1 second. Corresponding to the frames 1202 and 1204, temporally co-located frames in the sequence V2 1000 may be determined to be the frame 1002 (being the frame P1) and the frame 1062 (being the frame P2) respectively, as the frame 1002 and the frame 1062 have similar time difference T3 1104 of 1 second, and occur at the same time intervals.

At 408, at least one motion vector M is selected from the at least one first motion vector M1 or the at least one second motion vector M2 based on a cost function associated with the at least one first motion vector M1 and a cost function associated with the at least one first motion vector M2.

At 410, a reference frame is selected for generating the intermediate frame. The reference frame is one of the frame R1 and the frame R2 based on the selected at least one motion vector M.

At 412, the intermediate frame is generated based on the reference frame and the selected at least one motion vector M. The motion estimation is explained later with reference to FIGS. 5A and 5B.

At 414, a macroblock based blending of each intermediate frame of the sequence V1' with corresponding frame of the plurality of frames the sequence V2 is performed based on matching temporal location from each intermediate frame to generate a fused video sequence Vm. This is explained later with reference to FIG. 5C.

Figure 5A:
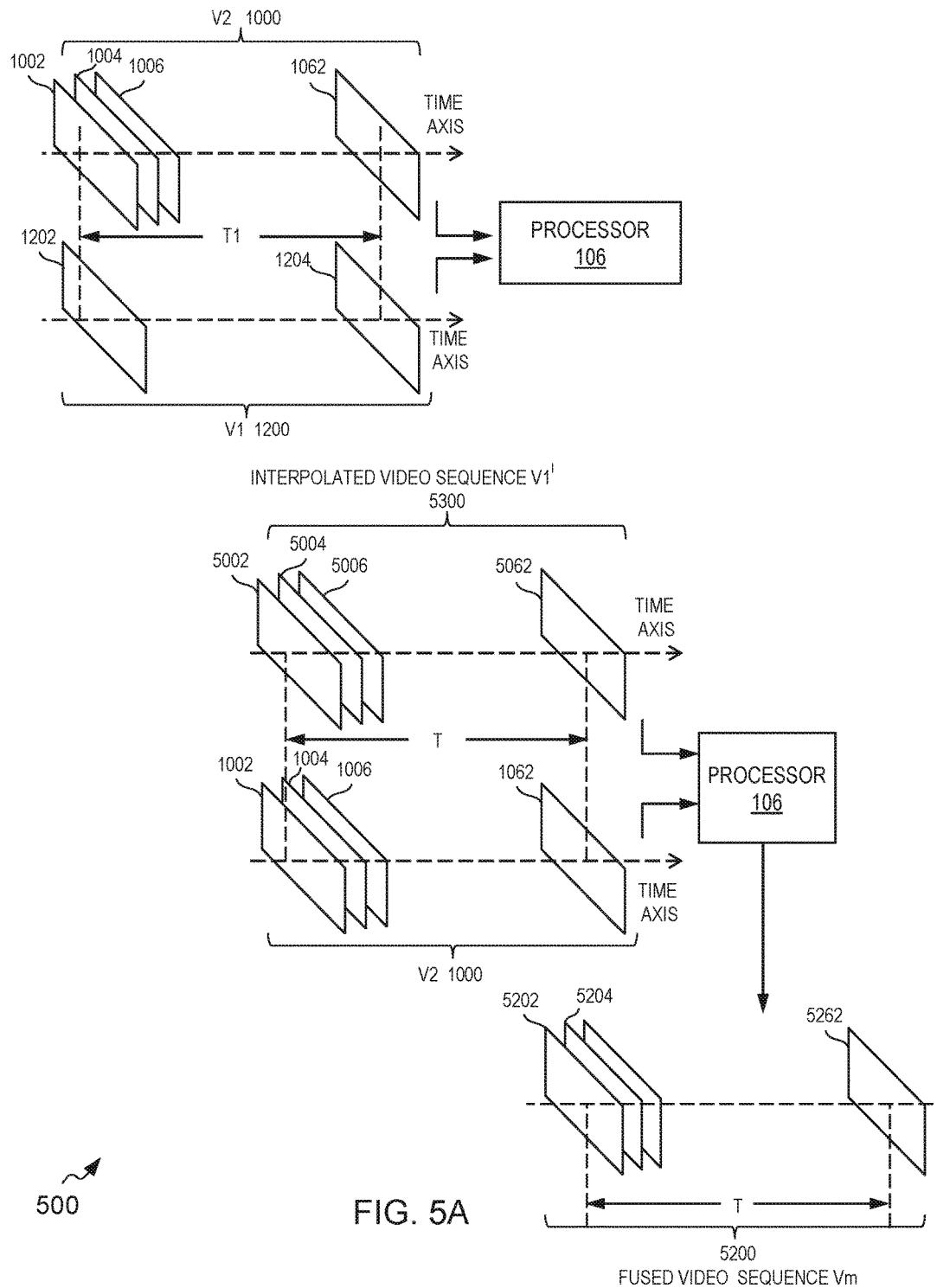
FIG. 5A illustrates an example representation of reconstruction of a fused video sequence, in accordance with another example embodiment of the disclosure.

FIG. 5A illustrates an example representation 500 of reconstruction of a fused video sequence Vm 5200, in accordance with another example embodiment of the disclosure. In one embodiment, the sequence V2 1000 and the sequence V1 1200 may be provided as inputs to the processor 106 of the VR device 104. The processor 106 may further include a motion estimation module (not shown in FIG. 5A) and a motion compensation module (not shown in FIG. 5A). The processor 106/the motion estimation module may select a frame 1004 (being frame P) of the sequence V2 1000 between the set of the frames 1002 (being frame P1) and 1062 (being frame P2) based on matching temporal location from a corresponding set of consecutive frames 1202 (being frame R1) and 1204 (being frame R2) of the sequence V1 1200. The processor 106 may only need to encode the difference between frames, instead of all of the information in each frame as the motion happens in a group of pixels referred to as macroblock. The motion estimation is performed to find a macroblock in the reference frame with the lowest cost for each macroblock in the encoded frame. Without loss of generality, a macroblock can be a 16×16 pixel area in a frame.

The frames P, P1 and P2 are divided into m×n macroblocks and every macroblock of the frame P is predicted based on generating a motion vector with corresponding macroblock of the frames P1 and P2. The movement of the macroblock in horizontal and vertical direction is referred as motion vector. Evaluation of motion vectors require match between the macroblock of current frame P and the macroblock of frames P1 and P2 used as reference to determine the motion estimation. The matching operation of one macroblock with another is dependent on the output of a cost function applied to the motion vectors. This is explained further with reference to FIG. 5B.

Figure 5B:
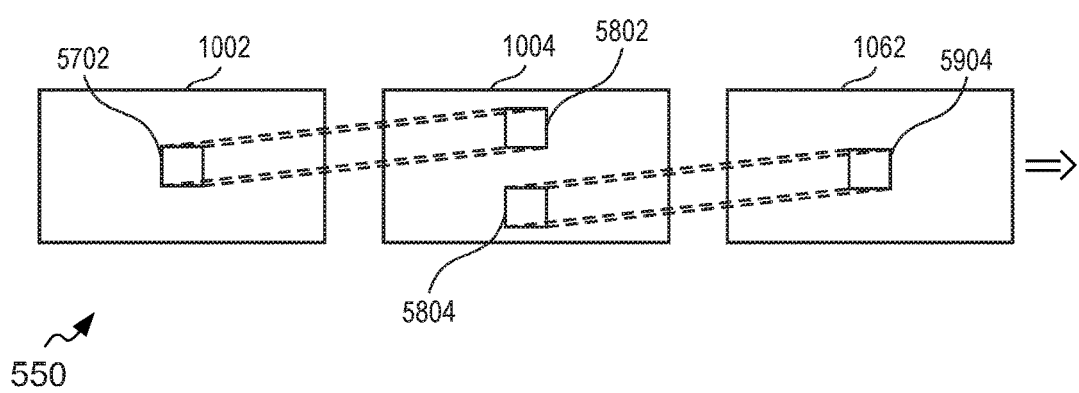
FIG. 5B illustrates an example representation of selection of a reference picture for generating an interpolated video sequence, in accordance with another example embodiment of the disclosure.

FIG. 5B illustrates an example representation 550 of selection of a reference picture for generating an interpolated video sequence V1' 5300 of FIG. 5A, in accordance with another example embodiment of the disclosure. In an embodiment, the sequence V1' 5300 is an example of a motion predicted video sequence. The frame 1004 (i.e., the frame P) is shown with two exemplary macroblocks MB(bx, by) 5802 and MB(bx, by) 5804 where (bx, by) is a macroblock location. A motion vector M1 may be generated between MB(bx, by) 5802 and a macroblock MB(bx, by) 5702 of the frame 1002 (i.e., the frame P1) for determining the motion estimation between the frame 1004 and the frame 1002. M1 may exemplarily be represented as MV(p1, p, bx, by). Similarly, a motion vector M2 may be generated between MB(bx, by) 5804 and a macroblock MB(bx, by) 5904 of the frame 1062 (i.e., the frame P2) for determining the motion estimation between the frame 1004 and the frame 1062. M2 may exemplarily be represented as MV(p2, p, bx, by).

Further, a cost of M1 (e.g., Cost(MV(p1, p, bx, by))) and a cost of M2 (e.g., Cost(MV(p2, p, bx, by))) may be determined using a cost function. The cost function is applied to determine similarity between two macroblocks. The best match between two macroblocks refers to the macroblock with the best output. The cost function finds the dissimilarity between two macroblocks. For example, lower the value of the cost function, more is the dependency between those two macroblocks. Some non-exhaustive examples of the cost functions include mean squared difference, mean absolute difference, pixel difference classification and the like. In an embodiment, the cost of the M1 is compared with the cost of M2 to select the motion vector with a lower cost to be assigned as a motion vector M for a macroblock of the frame P. A reference picture REF(bx, by) from the frame P1 is assigned if M is assigned M1. For example, MB(bx, by) 5702 may be used from the frame P1 if M is assigned M1. A reference picture REF(bx, by) from the frame P2 is assigned if M is assigned M2. For example, MB(bx, by) 5904 may be used from the frame P2 if M is assigned M2. Further, a cost of M is generated based on the assigned motion vector with the lower cost. In an embodiment, aforesaid motion estimation may be performed in integer accuracy. Video encoding standards such as standard H.264 may be deployed to further improve a quality of the motion estimation.

In an embodiment, determination of the reference pictures using motion estimation technique may be utilized by a motion compensation module of the processor 106 to perform a motion compensation to generate an interpolated video sequence V1' 5300 (hereinafter referred to as sequence V1' 5300). The sequence V1' 5300 includes a plurality of intermediate frames such as a frame 5002 a frame 5004, a frame 5006, . . . a frame 5062 and the like, as shown in FIG. 5A. The motion compensation module/the processor 106 may generate an intermediate frame such as the frame 5004 using a motion predicted macroblock as explained hereinafter.

For example, a motion predicted macroblock MPB1(bx, by) is determined using the motion vector M and the frame R1 (i.e., the frame 1202 of sequence V1 1200) as an actual reference frame, if the reference picture REF(bx, by) is assigned from the frame P1. MPB1(bx, by) may exemplarily be represented as MB(R1, M). Similarly, a motion predicted macroblock MPB2(bx, by) is determined using the motion vector M and the frame R2 (i.e., the frame 1204 of sequence V1 1200) as an actual reference frame, if the reference picture REF(bx, by) is assigned from the frame P2. MPB2 (bx, by) may exemplarily be represented as MB(R2, M). Such motion compensation may be performed for each MB(bx, by) of the frame 1004 using the frames 1202 and 1204 as the reference frames, and the motion vector M being M1 or M2 to create a motion predicted intermediate frame 5004 of the sequence V1' 5300. Further, repeating the motion compensation for all frames of the sequence V2 1000, results in the interpolated/motion predicted video sequence V1' 5300.

In one embodiment, a macroblock based blending of the intermediate frame 5004 of the sequence V1' 5300 with a corresponding frame 1004 of the sequence V2 1000 may be performed by the processor 106 based on matching temporal location from the intermediate frame 5004 to generate a (motion compensated) fused video sequence Vm 5200 (hereinafter alternatively referred to as sequence Vm 5200). As shown, the sequence Vm 5200 may include a plurality of fused video frames such as a frame 5202, a frame 5204, a frame 5206 . . . a frame 5262 and the like. The sequence Vm 5200 may be an example of the sequence Vm 1400.

Figure 5C:
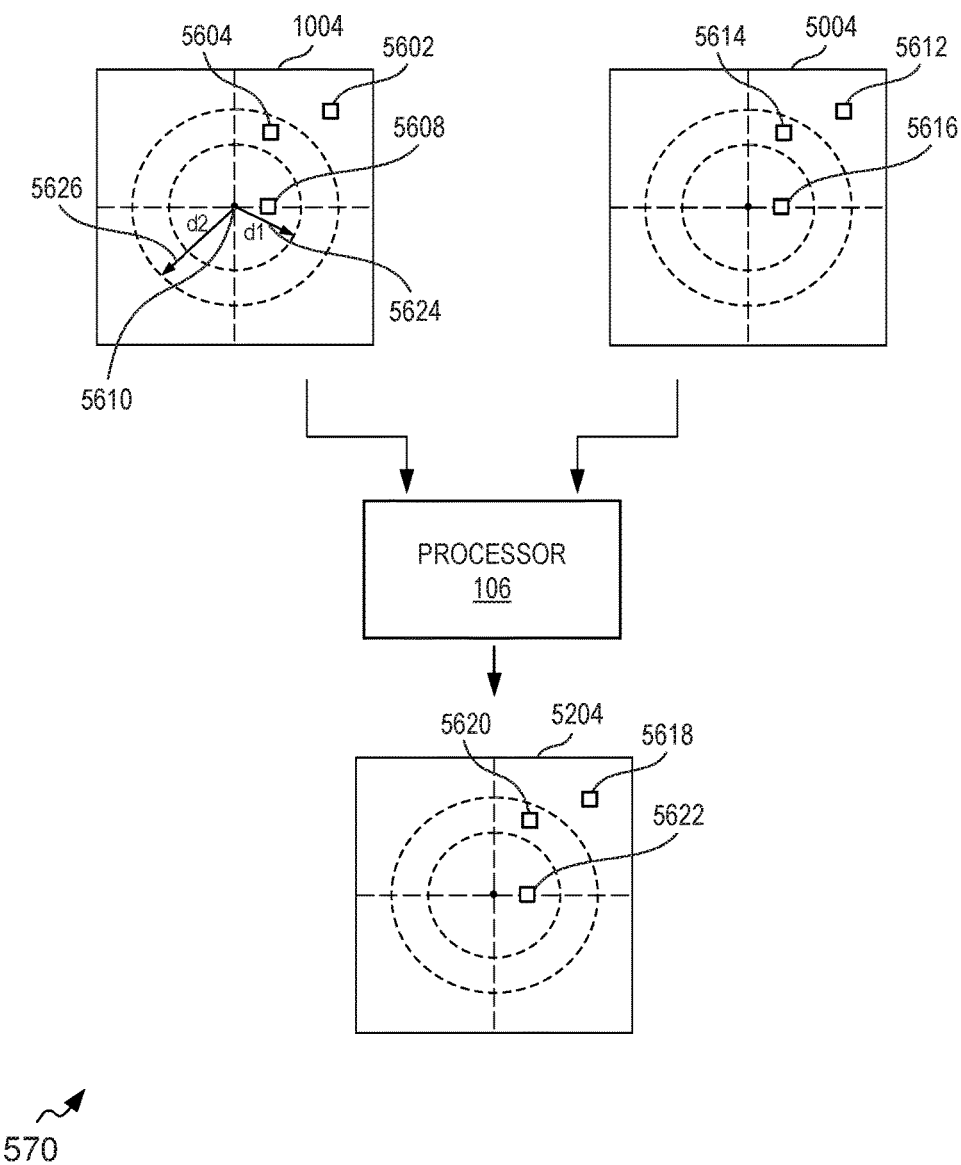
FIG. 5C illustrates an example representation of reconstruction of a frame of the fused video sequence of FIG. 5A using macroblock based blending, in accordance with another example embodiment of the disclosure.

FIG. 5C illustrates an example representation 570 of reconstruction of a frame 5204 (being frame F) of the fused video sequence Vm 5200 of FIG. 5A using macroblock based blending, in accordance with another example embodiment of the disclosure. More specifically, FIG. 5C shows spatial fusion of the frame 5004 (being frame R') of the sequence V1' 5300 with a frame 1004 (being frame P) of the conventional viewport sequence V2 1000. The spatial fusion may be based on a macroblock level of the frame R' of the sequence V1' and the frame P of the sequence V2. Further, alpha based blending may be performed on the macroblock level to generate the fused frame 5204. The macroblock based blending for a macroblock MB(F, bx, by) of a fused video frame F of the sequence Vm 5200 is performed based on the following equation:

$$MB(F,bx,by)=alpha*MB(P,bx,by)+(1-alpha)*MB(R', bx,by) \quad (3)$$

where,
(bx, by) is a macroblock location.
MB(F, bx, by) is a value of a macroblock at the macroblock location (bx, by) of the fused video frame F of the Vm sequence.
alpha is a blending factor at the macroblock location (bx, by) and is a function of the cost of motion vector M.
MB(P, bx, by) is a value of a macroblock at the macroblock location (bx, by) of the corresponding frame P of the sequence V2.
MB(R', bx, by) is a value of a macroblock at the macroblock location (bx, by) of the intermediate frame R' of the sequence V1'.

The blending factor alpha may also be a function of a location of a macroblock MB(bx, by) in the frame P and a correspondingly located macroblock MB(bx, by) in the frame R'. The value of the blending factor alpha is determined based on a normalized distance of a location of the MB(bx, by) to be reconstructed from the center of a video frame i.e., a view center (bx0, by0) 5610. The closer the location of the MB(bx, by) is to the view center (bx0, by0) 5610, the closer is the value of the blending factor alpha to 1.0. The farther the location of the MB(bx, by) from the view center (bx0, by0) 5610, the closer is the value of the blending factor alpha to a value 0.0.

If the location of a MB(bx, by) is closer to the view center (bx0, by0) 5610 such as within a radial distance d1 5624, the blending factor alpha may be set close to a value of 1.0. As a result, a macroblock in the similar location of the fused frame F may primarily include content of the MB(bx, by) in the frame P. In such scenario, the equation (3) may be exemplarily represented as MB(F, bx, by)=MB(P, bx, by). For example, as macroblock 5608 of the frame 1004 lies closer to the view center (bx0, by0) 5610, the content from the macroblock 5608 may primarily be used instead of correspondingly co-located macroblock 5616 of the frame 5004, for reconstructing a macroblock 5622 of the fused frame 5204. Additionally, as the blending factor alpha is the function of the motion estimation cost assigned to the MB(bx, by) of the frame P, if the motion estimation cost is low, content from the correspondingly located macroblock 5616 of the frame 5004 may be used to reconstruct the macroblock 5622 of the fused frame 5204 instead of the macroblock 5608. In such a case, front view of the fused frame 5204 is reconstructed completely from the frame 1004 of the sequence V2 1000, and it may have high quality resolution and a high frame rate.

If the location of the MB(bx, by) is farther from the view center (bx0, by0) 5610 such as farther than a radial distance d2 5626, then the blending factor alpha may be set close to a value of 0.0. As a result, a macroblock in the similar location in the fused frame F may primarily comprise content from the correspondingly located MB(bx, by) of the R' frame. In such scenario, the equation (3) may be exemplarily represented as MB(F, bx, by)=MB(R', bx, by). For example, as macroblock 5602 is located at a radial distance greater than the radial distance d2 5626 from the view center (bx0, by0) 5610, for reconstructing the macroblock 5618 of the fused frame 5204, content of a correspondingly located macroblock 5612 of the frame 5004 may be used primarily. In other words, a rear view of the fused frame 5204 is reconstructed from the intermediate frame 5004 of the sequence V1' 5300.

If the location of the MB(bx, by) is between the radial distance d1 5624 and the radial distance d2 5626, then the blending factor alpha may be assigned a value between 0.0 and 1.0. As a result, the macroblock of the fused frame F may comprise partially of content from the MB(bx, by) of the P frame and partially of content from the MB(bx, by) of the R' frame. For example, as macroblock 5604 is located at a radial distance that lies between the radial distance d1 5624 and the radial distance d2 5626, content from the macroblock 5604 may be used partially along with content from a correspondingly located macroblock 5614 of the frame 5004 to reconstruct the macroblock 5620 of the fused frame 5204. Accordingly, a side view of the fused frame 5204 may include a blending of the intermediate frame 5004 and the conventional viewport frame 1004. Aforesaid reconstruction may be repeated for each macroblock of the frame P to derive the fused frame Vm, and may be repeated for each frame of the sequence V2 1000 to derive the motion compensated fused video sequence Vm 5200 as shown in FIG. 5A.

As explained hereinabove, a 360-degree fused video generated by the processor 106 using the input sequences V1 and V2 by applying motion estimation and motion compensation can provide a sharp reconstructed video frame even when there is a huge amount of motion in the video content by reducing the motion blur. Such motion compensated fused video sequence may show higher resolution and video quality for all types of motion.

Figure 6:
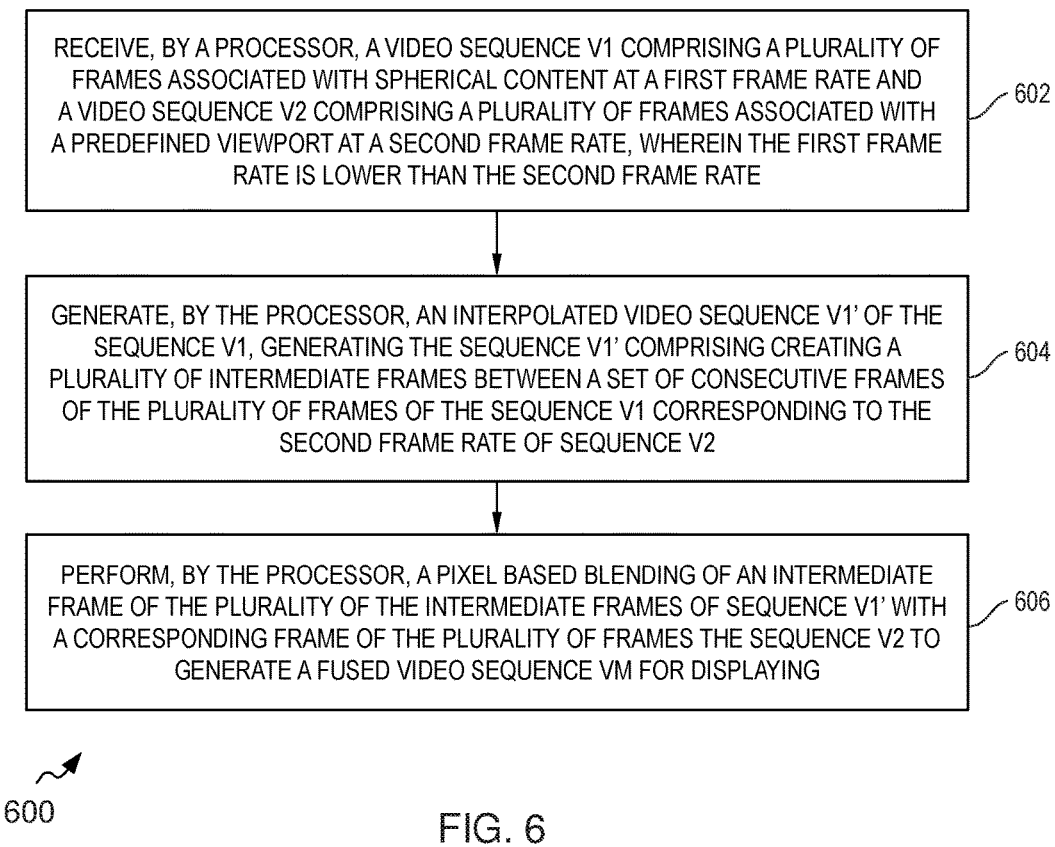
FIG. 6 shows a flowchart illustrating a method for reconstructing a 360-degree video, in accordance with an example embodiment of the disclosure.

FIG. 6 shows a flowchart illustrating a method 600 for reconstructing a 360-degree video, in accordance with an example embodiment of the disclosure. The various steps and/or operations of the flow diagram, and combinations of steps/operations in the flow diagram, may be implemented by, for example, hardware, firmware, a processor, circuitry and/or by a system or various components such as the processor 106 or the VR device 104 of FIG. 1A and/or by a different electronic device associated with the execution of software that includes one or more computer program instructions.

At 602, the method 600 includes receiving, by a processor, a video sequence V1 and a video sequence V2. The video sequence V1 includes a plurality of frames associated with spherical content at a first frame rate and the video sequence V2 includes a plurality of frames associated with a predefined viewport at a second frame rate. The first frame rate is lower than the second frame rate.

At 604, the method 600 includes generating, by the processor, an interpolated video sequence V1' of the sequence V1. Generating the sequence V1' includes creating a plurality of intermediate frames between a set of consecutive frames of the plurality of frames of the sequence V1 corresponding to the second frame rate of sequence V2.

At 606, the method 600 includes performing, by the processor, a pixel based blending of an intermediate frame of the plurality of the intermediate frames of sequence V1' with a corresponding frame of the plurality of frames the sequence V2 to generate a fused video sequence Vm for displaying. The method ends at operation 606.

Figure 7:
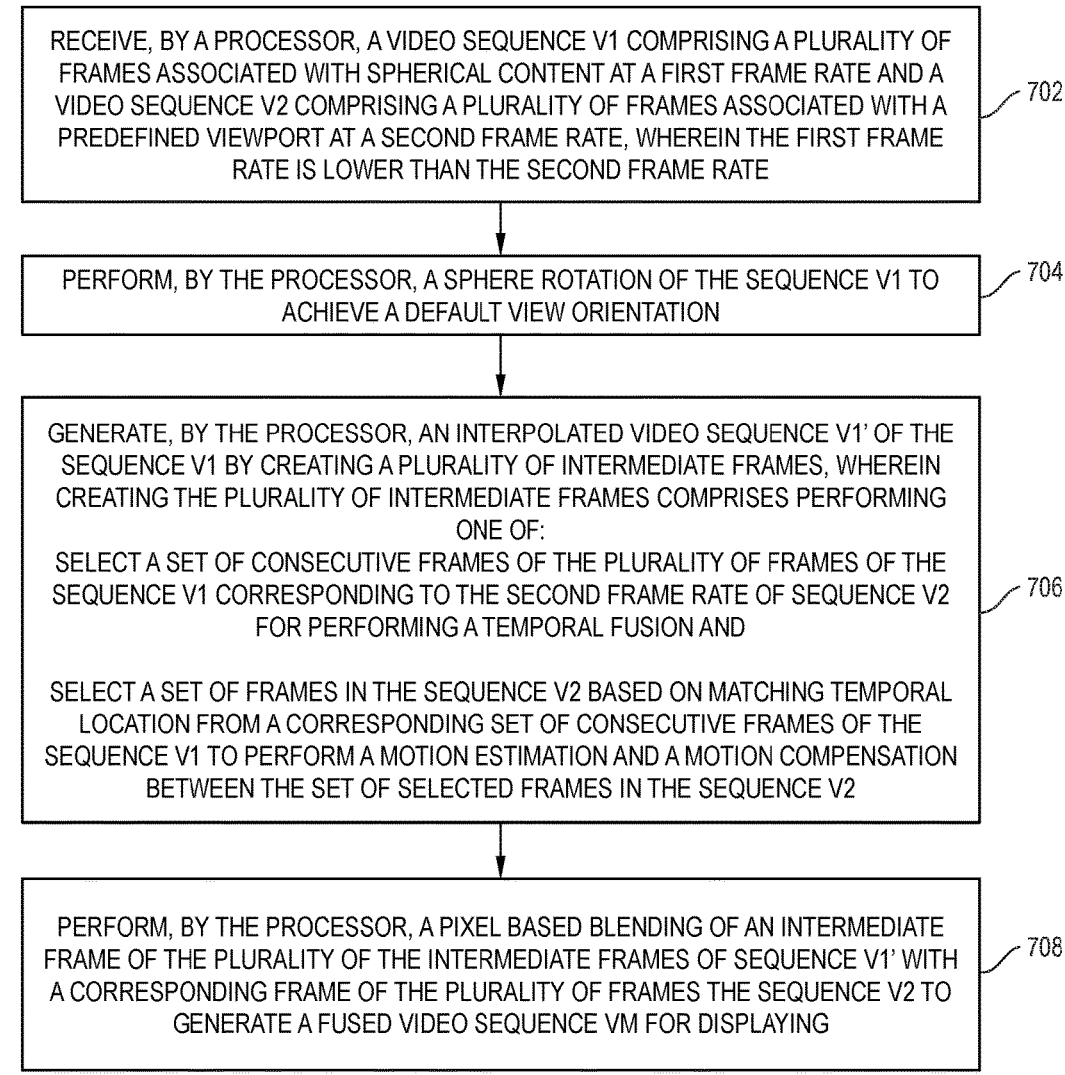
FIG. 7 shows a flowchart illustrating a method for reconstructing a 360-degree video, in accordance with another example embodiment of the disclosure.

FIG. 7 shows a flowchart illustrating a method 700 for reconstructing a 360-degree video, in accordance with another example embodiment of the disclosure. The various steps and/or operations of the flow diagram, and combinations of steps/operations in the flow diagram, may be implemented by, for example, hardware, firmware, a processor, circuitry and/or by a system or various components such as the processor 106 or the VR device 104 of FIG. 1A and/or by a different electronic device associated with the execution of software that includes one or more computer program instructions.

At 702, the method 700 includes receiving, by a processor, a video sequence V1 and a video sequence V2. The video sequence V1 includes a plurality of frames associated with spherical content at a first frame rate and the video sequence V2 includes a plurality of frames associated with a predefined viewport at a second frame rate. The first frame rate is lower than the second frame rate.

At 704, the method 700 includes performing, by the processor, a sphere rotation of the sequence V1 to achieve a default view orientation.

At 706, the method 700 includes generating, by the processor, an interpolated video sequence V1' of the sequence V1 by creating a plurality of intermediate frames. Creating the plurality of intermediate frames includes performing one of—selecting a set of consecutive frames of the plurality of frames of the sequence V1 corresponding to the second frame rate of sequence V2 for performing a temporal fusion and selecting a set of frames in the sequence V2 based on matching temporal location from a corresponding set of consecutive frames of the sequence V1 to perform a motion estimation and a motion compensation between the set of selected frames in the sequence V2.

At 708, the method 700 includes performing, by the processor, a pixel based blending of an intermediate frame of the plurality of the intermediate frames of sequence V1' with a corresponding frame of the plurality of frames the sequence V2 to generate a fused video sequence Vm for displaying. The method ends at operation 708.

FIG. 8 illustrates a simplified block diagram of a system 800 configured to reconstruct a 360-degree video, in accordance with an example embodiment of the disclosure. The system 800 includes at least one processor such as a processor 802 communicably coupled to at least one memory such as a memory 804, an input/output module 806, a communication module 808 and a frame interpolator 810. The frame interpolator further includes a motion estimation module 812 and a motion compensation module 814. In one embodiment, the system 800 is included within a VR equipment such as a headgear/VR device 104 explained with reference to FIG. 1A. In some embodiments, the system 800 may be distributed and hosted partially on a server, and may be configured to deliver or stream the reconstructed 360-degree video over a communication network such as the network 120 to the VR display device 104.

Although the system 800 is depicted to include only one processor 802, the system 800 may include more number of processors therein. The processor 106 shown in FIG. 1A, may be one of the processors embodied as the processor 802. In an embodiment, the memory 804 is capable of storing image processing instructions 805 that are machine executable instructions and may be associated with a video reconstruction application configured to facilitate reconstruction of the 360-degree video. Further, the processor 802 is capable of executing the stored image processing instructions 805. In an embodiment, the processor 802 may be embodied as a multi-core processor, a single core processor, or a combination of one or more multi-core processors and one or more single core processors. For example, the processor 802 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, and the like. In an embodiment, the processor 802 may be configured to execute hard-coded functionality. In an embodiment, the processor 802 may be embodied as an executor of software instructions, wherein the software instructions may specifically configure the processor 802 to perform algorithms and/or operations described herein when the software instructions are executed.

The memory 804 may be embodied as one or more volatile memory devices, one or more non-volatile memory devices, and/or a combination of one or more volatile memory devices and non-volatile memory devices. For example, the memory 804 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash ROM, RAM (random access memory), etc.).

The input/output module 806 (hereinafter referred to as I/O module 806) is configured to facilitate provisioning of an output and/or receiving an input. Examples of the I/O module 806 include, but are not limited to, an input interface and/or an output interface. Some examples of the input interface may include, but are not limited to, a keyboard, a mouse, a joystick, a keypad, a touch screen, soft keys, a microphone, and the like. Some examples of the output interface may include, but are not limited to, a display such as for example, a light emitting diode display, a thin-film transistor (TFT) display, a liquid crystal display, an active-matrix organic light-emitting diode (AMOLED) display, and the like, a speaker, a ringer, a vibrator, and the like.

In an example embodiment, the processor 802 may include I/O circuitry configured to control at least some functions of one or more elements of I/O module 806, such as, for example, a speaker, a microphone, a display, and/or the like. The processor 802 and/or the I/O circuitry may be configured to control one or more functions of the one or more elements of the I/O module 806 through computer program instructions, for example, software and/or firmware, stored on a memory, for example, the memory 804, and/or the like, accessible to the processor 802.

The communication module 808 enables the system 800 to communicate with other entities over various types of networks, such as for example, wired or wireless networks or combinations of wired and wireless networks, such as for example, the Internet. To that effect, the communication module 808 may include a transceiver circuitry configured to enable transmission and reception of data signals over the various types of communication networks such as the network 120 of FIG. 1A. In an embodiment, the communication module 808 may receive a set of input video sequences such as the spherical content with full resolution video sequence V1 1200 and the conventional viewport with variable resolution video sequence V2 1000 as shown in FIG. 1A. The communication module 808 may be further configured to transmit the reconstructed 360-degree video to the VR display device 104 or any such device. In some embodiments, the communication module 808 may include appropriate data compression and encoding mechanisms for securely transmitting and receiving video data.

In an example embodiment, the communication module 808 may include relevant application programming interfaces (APIs) to facilitate reception of the application from an application store hosted on the remote server. The video reconstruction application may then be stored by the communication module 808 in the memory 804. The processor 802 may be configured to execute the video reconstruction program application stored in the memory 804 in accordance with the image processing instructions 805, to reconstruct the 360-degree video for display on the VR display device 104.

The frame interpolator 810 is configured to generate an interpolated video sequence V1' of the sequence V1 1200. The examples of the interpolated video sequence V1' include the sequence V1' 1300 and the sequence V1' 5300. Further, in at least one embodiment, the processor 802 may incorporate therein the frame interpolator 810 and its various modules. The frame interpolator 810 is configured to generate the sequence V1' 1300 by creating a plurality of intermediate frames between a set of consecutive frames of the plurality of frames of the sequence V1 1200 based on temporal fusion technique. The frame interpolator 810 further includes the motion estimation module 802 and the motion compensation module 814 configured to collectively generate the sequence V1' 5300 which is a motion compensated intermediate video sequence. For example, the motion compensation module 814 may include dedicated algorithms for performing motion compensation to predict a frame in a video. Some non-exhaustive examples of the motion compensation algorithms include block motion compensation, variable block-size motion compensation, overlapped block motion compensation and the like. The processor 802 is communicably coupled to the frame interpolator 810 and is configured to perform a pixel based blending of an intermediate frame of the plurality of the intermediate frames of sequence V1' (e.g., V1' 1300 or V1' 5300) with a corresponding frame of the plurality of frames the sequence V2 to generate a fused video sequence Vm for displaying on the VR device 104.

The system 800 as illustrated and hereinafter described is merely illustrative of a system that could benefit from embodiments of the disclosure and, therefore, should not be taken to limit the scope of the disclosure. It may be noted that the system 800 may include fewer or more components than those depicted in FIG. 8. As explained above, the system 800 may be included within or embody an electronic device. Moreover, the system 800 may be implemented as a centralized system, or, alternatively, the various components of system 800 may be deployed in a distributed manner while being operatively coupled to each other.

Various embodiments disclosed herein provide numerous advantages. The embodiments disclosed herein enable a smooth transition from a high resolution high frame rate video signal to a high resolution low frame rate video signal without noticeable visual effect. Further the disclosed embodiments, provide significant reduction of motion blurring that usually occurs when motion within the video signal is large. Sharpness of stationary objects in the video signal may be maintained along with the motion of moving objects within the video signal by applying various techniques such as temporal fusion, spatial fusion, motion estimation, motion compensation, pixel based blending and the like. Further, the disclosed embodiments enable balance between signal bandwidth and video compression as required in virtual reality devices without disruption in video display quality.

Although the disclosure has been described with reference to specific exemplary embodiments, it is noted that various modifications and changes may be made to these embodiments without departing from the broad spirit and scope of the disclosure. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the systems and methods may be embodied using transistors, logic gates, and electrical circuits (for example, application specific integrated circuit (ASIC) circuitry and/or in Digital Signal Processor (DSP) circuitry).

Particularly, the system 800/the VR device 104 and its various components may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations (for example, operations explained herein with reference to FIGS. 2, 4, 6 and 7). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:
receiving, by a processor, a video sequence V1 comprising a plurality of frames associated with spherical content at a first frame rate and a video sequence V2 comprising a plurality of frames associated with a predefined viewport at a second frame rate, wherein the first frame rate is lower than the second frame rate;
generating, by the processor, an interpolated video sequence V1' of the video sequence V1, generating the interpolated video sequence V1' comprising creating a plurality of intermediate frames between each set of consecutive frames R1, R2 of the plurality of frames of the video sequence V1 corresponding to the second frame rate of video sequence V2; and
performing, by the processor, a pixel based blending of each intermediate frame of the plurality of the intermediate frames of the interpolated video sequence V1' with a corresponding frame of the plurality of frames of the video sequence V2 to generate a fused video sequence Vm for displaying.

2. The method as claimed in claim 1, further comprising:
performing, by the processor, a sphere rotation of the video sequence V1 to achieve a default view orientation.

3. The method as claimed in claim 1, wherein creating an intermediate frame of the plurality of intermediate frames between each set of consecutive frames R1, R2 comprises performing a pixel based alpha blending based on an equation:

$$r'(i,x,y)=\text{alpha}(i)*R1(x,y)+(1-\text{alpha}(i))*R2(x,y))$$

wherein (x, y) is a pixel location,
wherein R1(x, y) is a pixel at the pixel location (x, y) of the frame R1 of the sequence V1,
wherein R2(x, y) is a pixel at the pixel location (x, y) of the consecutive frame R2 of the sequence V1,
wherein i is an index of the intermediate frame between the frames R1 and R2, wherein alpha(i) is a blending factor based on a value of i, and
wherein r' (i, x, y) is a pixel at the pixel location (x, y) of the intermediate frame between the frames R1 and R2 with the index i.

4. The method as claimed in claim 1, wherein generating the fused video sequence Vm further comprises performing for each intermediate frame R' of the plurality of the intermediate frames of sequence V1':
selecting a corresponding frame P of the plurality of frames of the video sequence V2 based on matching temporal location of the intermediate frame R'; and
performing a pixel based alpha blending of the intermediate frame R' with the corresponding frame P based on an equation:

$$F(x,y)=\text{alpha}(x,y)*P(x,y)+(1-\text{alpha}(x,y))*R'(x,y))$$

wherein (x, y) is a pixel location,
wherein F(x, y) is a value of a pixel at the pixel location (x, y) of the fused video frame F of the Vm sequence,
wherein alpha(x, y) is a blending factor at the pixel location (x, y),
wherein P(x, y) is a value of a pixel at the pixel location (x, y) of the corresponding frame P of the video sequence V2, and
wherein R'(x, y) is a value of a pixel at the pixel location (x, y) of the intermediate frame R' of the video sequence V1'.

5. The method as claimed in claim 4, wherein a value of alpha(x, y) is determined based on a distance of a location of the pixel (x, y) to be reconstructed from a view center (x0, y0), the view center (x0, y0) being a center of a video frame.

6. The method as claimed in claim 5, wherein a value of alpha(x, y) is set to 1.0 for a location of the pixel (x, y) lying within a predetermined distance of a pixel at a location (|x|<⅛, |y|<⅛) from the view center (x0, y0).

7. The method as claimed in claim 6, wherein a value of alpha(x, y) is set to 0.0 for a location of the pixel (x, y) lying outside a predetermined distance of a pixel at a location (|x|<⅜, |y|<⅜) from the view center (x0, y0).

8. The method as claimed in claim 6, wherein a value of alpha(x, y) is set between 1.0 to 0.0 for a location of the pixel (x, y) lying within a predetermined distance of a pixel at a location (⅜>|x|>⅛, ⅜>|y|>⅛) from the view center (x0, y0).

9. The method as claimed in claim 1, wherein the interpolated video sequence V1' is a motion predicted video sequence, and generating an intermediate frame between two consecutive frame R1 and R2 of the video sequence V1, the intermediate frame being a temporally co-located frame of a frame P in the video sequence V2, comprises:
determining at least one first motion vector M1 between the frames P and a frame P1 and at least one second motion vector M2 between the frame P and a frame P2, wherein the frame P1 is a frame in the video sequence V2 that is temporally co-located frame of the frame R1 in the video sequence V1, and wherein the frame P2 is a frame in the video sequence V2 that is temporally co-located frame of frame R2 in the video sequence V1;
selecting at least one motion vector M, the at least one motion vector M being selected from
the at least one first motion vector M1, or
the at least one second motion vector M2, based on a cost function associated with the at least one first motion vector M1 and a cost function associated with the at least one first motion vector M2;

selecting a reference frame for generating the intermediate frame, the reference frame being one of the frame R1 and the frame R2 based on the selected at least one motion vector M; and generating the intermediate frame based on the reference frame and the selected at least one motion vector M.

10. The method as claimed in claim 9, wherein each of the at least one first motion vector M1 is determined for a macroblock of a plurality of macroblocks of the frame P based on a motion estimation between the macroblock in the frame P and a corresponding macroblock in the frame P1, wherein each of the at least one first motion vector M2 is determined for the macroblock of a plurality of macroblocks of the frame P based on a motion estimation between the macroblock in the frame P and a corresponding macroblock in the frame P2.

11. The method as claimed in claim 9, further comprising, performing for each macroblock:

selecting the reference frame as the frame R1 if a cost function associated with a first motion vector M1 for the macroblock is less than a cost function associated with a second motion vector M2 for the macroblock;

selecting the reference frame as the frame R2 if the cost function associated with the second motion vector M2 for the macroblock is less than the cost function associated with the first motion vector M1 for the macroblock; and selecting one of the first motion vector M1 and the second motion vector M2 as a motion vector M for the macroblock, which has the smallest cost function.

12. The method as claimed in claim 11, further comprising:

determining a motion predicted macroblock for the intermediate frame using the motion vector M and the frame R1, if frame R1 is the reference frame;

determining a motion predicted macroblock for the intermediate frame using the motion vector M and the frame R2, if frame R1 is the reference frame; and wherein intermediate frame of the interpolated video sequence V1' is generated comprising a plurality of motion predicted macroblocks.

13. The method as claimed in claim 9, wherein generating the fused video sequence Vm comprises:

performing, by the processor, a macroblock based blending of an intermediate frame R' of the interpolated video sequence V1' with a corresponding frame P of the plurality of frames of the video sequence V2 based on matching temporal location from the intermediate frame R' to generate the fused video sequence Vm, wherein the macroblock based blending for a macroblock MB(F, bx, by) of a fused video frame F of the fused video sequence Vm is performed based on an equation:

$$MB(F,bx,by)=alpha*MB(P,bx,by)+(1-alpha)*MB(R', bx,by)$$

wherein (bx, by) is a macroblock location, wherein MB(F, bx, by) is a value of a macroblock at the macroblock location (bx, by) of the fused video frame F of the fused video Vm sequence, wherein alpha is a blending factor at the macroblock location (bx, by) and is a function of the cost of a motion vector M, wherein MB(P, bx, by) is a value of a macroblock at the macroblock location (bx, by) of the corresponding frame P of the video sequence V2, and wherein MB(R', bx, by) is a value of a macroblock at the macroblock location (bx, by) of the intermediate frame R' of the interpolated video sequence V1'.

14. The method as claimed in claim 13, wherein a value of alpha is determined based on a distance of a location of the macroblock (bx, by) to be reconstructed from a view center (bx0, by0), the view center (bx0, by0) being a center of a video frame.

15. A system, comprising:

a communication interface configured to receive a video sequence V1 comprising a plurality of frames associated with spherical content at a first frame rate and a video sequence V2 comprising a plurality of frames associated with a predefined viewport at a second frame rate, wherein the first frame rate is lower than the second frame rate;

a frame interpolator configured to generate an interpolated video sequence V1' of the video sequence V1, generating the interpolated video sequence V1' comprising creating a plurality of intermediate frames between each set of consecutive frames R1, R2 of the plurality of frames of the video sequence V1 corresponding to the second frame rate of video sequence V2;

a memory comprising executable instructions; and a processor communicably coupled to the communication interface and the frame interpolator, the processor configured to execute the instructions to cause to the system to perform a pixel based blending of each intermediate frame of the plurality of the intermediate frames of the interpolated video sequence V1' with a corresponding frame of the plurality of frames of the video sequence V2 to generate a fused video sequence Vm for displaying.

16. The system as claimed in claim 15, wherein the system is further caused to:

perform a sphere rotation of the sequence V1 to achieve a default view orientation.

17. The system as claimed in claim 15, wherein the frame interpolator further comprises:

a motion estimation module configured to perform a motion estimation between a set of frames in the video sequence V2, wherein the set of frames are selected based on matching temporal location from a corresponding set of consecutive frames of the video sequence V1; and a motion compensation module configured to perform a motion compensation between the set of selected frames in the video sequence V2 to generate the interpolated video sequence V1', wherein the processor is configured to perform the pixel based blending of an intermediate frame of the interpolated video sequence V1' with a corresponding frame of the plurality of frames the video sequence V2 to generate the fused video sequence Vm, and wherein performing the pixel based blending comprises performing a macroblock based blending.

18. The system as claimed in claim 15, wherein creating an intermediate frame of the plurality of intermediate frames between each set of consecutive frames R1, R2 comprises performing a pixel based alpha blending based on an equation:

$$r'(i,x,y)=alpha(i)*R1(x,y)+(1-alpha(i))*R2(x,y)$$

wherein (x, y) is a pixel location, wherein R1(x, y) is a pixel at the pixel location (x, y) of the frame R1 of the sequence V1, wherein R2(x, y) is a pixel at the pixel location (x, y) of the consecutive frame R2 of the sequence V1, wherein i is an index of the intermediate frame between the frames R1 and R2, wherein alpha(i) is a blending factor based on a value of i, and wherein r' (i, x, y) is a pixel at the pixel location (x, y) of the intermediate frame between the frames R1 and R2 with the index i.

19. A computer-implemented method, comprising:

receiving, by a processor, a video sequence V1 comprising a plurality of frames associated with spherical content at a first frame rate and a video sequence V2 comprising a plurality of frames associated with a predefined viewport at a second frame rate, wherein the first frame rate is lower than the second frame rate;

performing, by the processor, a sphere rotation of the video sequence V1 to achieve a default view orientation;

generating, by the processor, an interpolated video sequence V1' of the rotated video sequence V1 by creating a plurality of intermediate frames, wherein creating the plurality of intermediate frames comprises performing one of:

selecting a set of consecutive frames of the plurality of frames of the video sequence V1 corresponding to the second frame rate of video sequence V2 for performing a temporal fusion; and selecting a set of frames in the video sequence V2 based on matching temporal location from a corresponding set of consecutive frames of the video sequence V1 to perform a motion estimation and a motion compensation between the set of selected frames in the video sequence V2; and performing, by the processor, a pixel based blending of an intermediate frame of the plurality of the intermediate frames of sequence V1' with a corresponding frame of the plurality of frames the sequence V2 to generate a fused video sequence Vm for displaying.

20. The method as claimed in claim 19, wherein performing the pixel based blending further comprising performing, by the processor, a macroblock based blending of an intermediate frame of the interpolated video sequence V1' with a corresponding frame of the plurality of frames the video sequence V2 to generate the fused video sequence Vm for displaying.

* * * * *